United States Patent
Yamane et al.

(10) Patent No.: US 10,554,383 B2
(45) Date of Patent: Feb. 4, 2020

(54) ANALYSIS SYSTEM, ANALYSIS METHOD, AND STORAGE MEDIUM

(71) Applicant: NEC Corporation, Minato-ku, Tokyo (JP)

(72) Inventors: Masato Yamane, Tokyo (JP); Yuki Ashino, Tokyo (JP); Masafumi Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 268 days.

(21) Appl. No.: 15/512,154

(22) PCT Filed: Sep. 17, 2015

(86) PCT No.: PCT/JP2015/004755
§ 371 (c)(1),
(2) Date: Mar. 17, 2017

(87) PCT Pub. No.: WO2016/047115
PCT Pub. Date: Mar. 31, 2016

(65) Prior Publication Data
US 2017/0279601 A1 Sep. 28, 2017

(30) Foreign Application Priority Data
Sep. 25, 2014 (JP) .................................. 2014-195177

(51) Int. Cl.
*H04L 9/08* (2006.01)
*H04L 9/14* (2006.01)
(Continued)

(52) U.S. Cl.
CPC ................ *H04L 9/003* (2013.01); *H04L 9/08* (2013.01); *H04L 9/0819* (2013.01);
(Continued)

(58) Field of Classification Search
CPC ......... H04L 9/003; H04L 9/08; H04L 9/0819; H04L 9/0822; H04L 9/14; H04L 41/0853; H04L 63/065; G06F 21/56
(Continued)

(56) References Cited

U.S. PATENT DOCUMENTS

| 5,574,785 A | 11/1996 | Ueno et al. |
| 2008/0022146 A1* | 1/2008 | Kocher ..................... G06F 7/00 713/600 |

(Continued)

FOREIGN PATENT DOCUMENTS

| JP | H07-327029 A | 12/1995 |
| JP | 2003-124924 A | 4/2003 |

(Continued)

OTHER PUBLICATIONS

Wenjie Lin et al: "Traceback Attacks in Cloud—Pebbletrace Botnet", 32nd IEEE International Conference on Distributed Computing Systems Workshops, ICDCSW 2012, IEEE, Jun. 18, 2012, pp. 417-426, XP032217981, DOI: 10.1109/ICDCSW.2012.61 ISBN: 978-1-4673-1423-7.

(Continued)

*Primary Examiner* — Harunur Rashid
*Assistant Examiner* — Sakinah White Taylor

(57) ABSTRACT

An analysis system that is able to obtain correct encryption key is provided. The analysis system includes a processing circuitry configured to function as a cryptanalysis processing unit. The cryptanalysis processing unit includes: a key candidate extraction unit that is configured to extract, from second data, one or more candidates of key data that include an encryption key that enables to decrypt first data encrypted by a specific encryption scheme, based on data indicating a feature of the key data; and a decryption unit that is configured to extract, from the extracted candidates of key (Continued)

data, correct key data that enables to correctly decrypt the encrypted first data, based on a result of decrypting the first data by use of the extracted candidates of key data.

18 Claims, 20 Drawing Sheets

(51) Int. Cl.
*H04L 9/00* (2006.01)
*H04L 12/24* (2006.01)
*H04L 29/06* (2006.01)

(52) U.S. Cl.
CPC .............. *H04L 9/0822* (2013.01); *H04L 9/14* (2013.01); *H04L 41/0853* (2013.01); *H04L 63/065* (2013.01)

(58) Field of Classification Search
USPC .......................................................... 713/171
See application file for complete search history.

(56) References Cited

U.S. PATENT DOCUMENTS

| | | | |
|---|---|---|---|
| 2008/0031446 | A1 | 2/2008 | Suga |
| 2010/0154032 | A1 | 6/2010 | Ollmann |
| 2010/0199129 | A1 | 8/2010 | Kitani |
| 2011/0093952 | A1 | 4/2011 | Kumar et al. |
| 2011/0099634 | A1 | 4/2011 | Conrad et al. |
| 2013/0124924 | A1 | 5/2013 | Kawaguchi et al. |

FOREIGN PATENT DOCUMENTS

| | | | |
|---|---|---|---|
| JP | 2006-279938 A | 10/2006 | |
| JP | 2007-116752 A | 5/2007 | |
| JP | 2008-245080 A | 10/2008 | |
| JP | 2009-037545 A | 2/2009 | |
| JP | 2011-154727 A | 8/2011 | |
| JP | 2012-511847 A | 5/2012 | |
| JP | 2013-507722 A | 3/2013 | |
| JP | 2013-508823 A | 3/2013 | |
| JP | 2013-105366 A | 5/2013 | |
| JP | 2013-114637 A | 6/2013 | |
| JP | 2014-514651 A | 6/2014 | |

OTHER PUBLICATIONS

Hargreaves C et al: "Recovery of Encryption Keys form Memory Using a Linear Scan", Third International Conference on Availability, Reliability and Security, 2008. ARES 08., IEEE, Piscataway, NJ, USA, Mar. 4, 2008, pp. 1369-1376, XP031264844, ISBN: 978-0-7695-3102-1.

Maartmann-Moe C et al: "The Persistence of Memory: Forensic Identification and Extraction of Cryptographic Keys", Digital Investigation, Elsevier, Amsterdam, NL, vol. 6, Sep. 1, 2009, pp. S132-S140, XP026471509, ISSN: 1742-2876, DOI:10.1016/J. DUN. 2009. 06. 002.

Communication dated Apr. 16, 2018, from the European Patent Office in counterpart European Application No. 15843652.7.

Brian D. Carrier, Joe Grand, "A hardware-based memory acquisition procedure for digital investigations", Digital Investigation vol. 1, Issue 1, Feb. 2004, pp. 50 to 60.

International Search Report for PCT Application No. PCT/JP2015/004755, dated Dec. 15, 2015.

English translation of Written opinion for PCT Application No. PCT/JP2015/004755.

Intellectual Property Office of Singapore for SG Application No. 11201702431P dated Nov. 16, 2017.

\* cited by examiner

KEY DATA ACQUISITION POLICY

| CRYPTOGRAPHIC COMMUNICATION PROTOCOL (401) | KEY DATA ACQUISITION CRITERION (402) | PROCESSING CONTENT (403) |
|---|---|---|
| SSL/TLS | (AFTER CHANGECIPHERSPEC IS TRANSMITTED FROM SSL/TLS SERVER) AND (BEFORE TRANSMISSION AND RECEPTION OF APPLICATION DATA START) | INSTRUCT MEMORY ACQUISITION UNIT TO ACQUIRE MEMORY. INSTRUCT COMMUNICATION CONTROL UNIT TO SUSPEND COMMUNICATION. |
| SSH | (AFTER SSH2_MSG_NEWKEYS IS TRANSMITTED AND RECEIVED) | INSTRUCT MEMORY ACQUISITION UNIT TO ACQUIRE MEMORY. INSTRUCT COMMUNICATION CONTROL UNIT TO SUSPEND COMMUNICATION. |
| IPSec (IKE) | ... | ... |
| ... | ... | ... |

COMMUNICATION DATA RECORDING POLICY (103e)

| CRYPTOGRAPHIC COMMUNICATION PROTOCOL (501) | COMMUNICATION DATA RECORDING CRITERION (502) | PROCESSING CONTENT (503) |
|---|---|---|
| SSL/TLS | (AFTER TRANSMISSION AND RECEPTION OF APPLICATION DATA ARE STARTED) | RECORD COMMUNICATION DATA FOR EACH ORIGINATOR. RECORD SOURCE AND ACQUISITION TIME FOR EACH PIECE OF COMMUNICATION DATA. |
| SSH | ... | ... |
| IPSec (IKE) | ... | ... |
| ... | ... | ... |

Fig. 7

KEY CANDIDATE DETERMINATION INFORMATION 104b

| ENCRYPTION ALGORITHM 701 | ENCRYPTION PARAMETER 702 | | EXECUTION ENVIRONMENT INFORMATION 703 | KEY CANDIDATE DETERMINATION CRITERION 704 |
|---|---|---|---|---|
| | KEY LENGTH (UNIT: BIT) | CIPHER MODE OF OPERATION | | |
| AES | 128 | CBC | A | 16 CONSECUTIVE BYTES OF DATA AREA WITH ENTROPY VALUE GREATER THAN OR EQUAL TO SPECIFIC REFERENCE VALUE |
| AES | 256 | CBC | B | 32 CONSECUTIVE BYTES OF DATA AREA WITH ENTROPY VALUE GREATER THAN OR EQUAL TO SPECIFIC REFERENCE VALUE |
| AES | 128 | GCM | C | 560 CONSECUTIVE BYTES OF DATA STARTING FROM 0x30,0x02,0x00,0x00,0x4b,0x53,0x4D |
| ... | ... | ... | ... | ... |

Fig. 8

KEY CANDIDATE STORING UNIT 104c

| ENCRYPTION ALGORITHM | ENCRYPTION PARAMETER | | KEY DATA CANDIDATE |
|---|---|---|---|
| | KEY LENGTH (UNIT: BIT) | MODE | |
| AES | 128 | CBC | 0x**,0x**,0x** ···(16 CONSECUTIVE BYTES OF DATA) |
| AES | 256 | CBC | 0x**,0x**,0x** ···(32 CONSECUTIVE BYTES OF DATA) |
| AES | 128 | GCM | 0x30,0x02,0x00,0x00,0x4b,0x53,0x53,0x4D··· (560 CONSECUTIVE BYTES OF DATA) |
| ... | ... | ... | ... |

801    802    803

ANALYSIS SYSTEM, ANALYSIS METHOD, AND STORAGE MEDIUM

This application is a National Stage Entry of PCT/JP2015/004755 filed on Sep. 17, 2015, which claims priority from Japanese Patent Application 2014-195177 filed on Sep. 25, 2014, the contents of all of which are incorporated herein by reference, in their entirety.

TECHNICAL FIELD

The present invention relates to a technology of analyzing cryptographic communication executed by an information communication apparatus and the like.

BACKGROUND ART

There is a demand for a technology of analyzing communication processing executed by an information processing apparatus (such as a computer) that is connected to a communication network (hereinafter simply referred to as an "information communication apparatus"), in recent years.

For example, such analysis of communication processing is used for analysis of behavior of an information communication apparatus during development and operation stages, or analysis of behavior of a communication processing program executed on an information communication apparatus.

There is a particular demand in recent years for a technology for analyzing a content of improper communication processing caused by an improper computer program (a computer program includes various types of software programs and may be hereinafter simply referred to as a "program"), such as a virus, that is executed on an information communication apparatus.

For example, when such an improper program (hereinafter referred to as "malware") executes various types of communication processing by using an advanced encryption scheme such as public key cryptography, it is difficult to decrypt (decode) a communication record (communication data).

For example, it is assumed that an information communication apparatus as an analysis target employs a specific cryptographic communication protocol (for example, assuming a case where a communication channel encrypted by the specific cryptographic communication protocol is established between information communication apparatuses being analysis targets). In this case, an encryption key, authentication information, and the like related to the cryptographic communication protocol is securely exchanged between the communication apparatuses. For example, the following cryptographic communication protocols may be used as the specific cryptographic communication protocol.

Secure Sockets Layer (SSL)/Transport Layer Security (TLS)
Internet Key Exchange (IKE) in Security Architecture for Internet Protocol (IPSec)
Secure Shell (SSH)

Generally, it is not easy to decrypt encrypted communication data transmitted and received in accordance with such a cryptographic communication protocol. Accordingly, a technology of collecting information about such cryptographic communication by analyzing an information communication apparatus (including various types of software programs executed on the information communication apparatus) executing the cryptographic communication is under study.

As an example of such a technology for analyzing an information communication apparatus, a technique of analyzing behavior of a specific program (for example, malware) on an information communication apparatus while running the program (hereinafter referred to as a "live forensics technique") is known. Such a live forensics technique executes various types of investigations and analyses on behavior of an apparatus (or a system) by collecting various types of information about the apparatus while the apparatus is in an operating state. For example, such a live forensics technique is able to investigate data, a program being executed, and the like stored in a volatile storage apparatus (for example, a memory), while an information processing apparatus is in operation.

For example, the following references are disclosed in relation to the aforementioned technology of analyzing behavior of an information processing apparatus, including communication processing.

PTL 1 (Japanese Translation of PCT International Application Publication No. 2014-514651) discloses a technology related to malware analysis. In the technology disclosed in PTL 1, a virtual machine monitor intercepts (acquires) various types of requests from an information processing apparatus implemented by use of a virtual machine and transfers the information to a security agent. The security agent determines whether or not a program executing such a request is malware, in accordance with the acquired information. The virtual machine monitor exists in a layer lower than the virtual machine, and therefore is able to acquire all requests executed on the virtual machine.

PTL 2 (Japanese Unexamined Patent Application Publication No. 2013-114637) discloses a technology related to malware analysis. The technology disclosed in PTL 2 extracts an encryption key used by malware from a memory space in an apparatus executing the malware, by analyzing a trace in execution of the malware and data referred to in an execution process. The technology disclosed in PTL 2 decrypts communication encrypted by the malware, by use of the extracted encryption key.

PTL 3 (Japanese Translation of PCT International Application Publication No. 2012-511847) discloses a technology of classifying cryptographic communication executed by malware and the like. The technology disclosed in PTL 3 detects unapproved cryptographic communication by comparing encrypted communication executed at an analysis target apparatus with preregistered approved encrypted communication. Further, when detecting unapproved cryptographic communication, the technology disclosed in PTL 3 blocks (suspends) such cryptographic communication.

PTL 4 (Japanese Unexamined Patent Application Publication No. 2009-037545) discloses a technology of classifying and distinguishing malware, in accordance with similarity of malware. The technology disclosed in PTL 4 classifies and distinguishes malware, in accordance with a correlation between micro analysis analyzing an execution code itself of malware and macro analysis analyzing communication related to the malware. As the micro analysis, the technology disclosed in PTL 4 discloses a configuration extracting an execution code of malware from a memory dumped at a predetermined timing in an analysis target machine, and disassembling the code.

PTL 5 (Japanese Unexamined Patent Application Publication No. 2006-279938) discloses a technology related to a cryptographic communication decoding apparatus that is arranged between two communication apparatuses and analyzes cryptographic communication between the communication apparatuses. The cryptographic communication decoding apparatus disclosed in PTL 5 analyzes communication data between two communication apparatuses and exchanges an encryption key with each of the communication apparatuses at a timing when key exchange in cryptographic communication (IPSec) is executed. Specifically, the cryptographic communication decoding apparatus disclosed in PTL 5 is arranged between the two communication apparatuses as an intermediary, and exchanges an encryption key with one of the communication apparatuses while also exchanging an encryption key with the other communication apparatus. Thus, the apparatus disclosed in PTL 5 is involved in cryptographic communication executed between the two communication apparatuses, decodes cryptographic communication data transmitted from one of the communication apparatuses, and transmits the data to a monitoring apparatus while encrypting the data again and transmitting the data to the other communication apparatus.

PTL 6 (Japanese Translation of PCT International Application Publication No. 2013-508823) discloses a technology of detecting malware by monitoring generation of a link file in a computer. The technology disclosed in PTL 6 analyzes information about a process of creating a link to various types of resources existing inside and outside the computer, and information about a referent of the created link. In accordance with the analysis result, the technology disclosed in PTL 6 executes a countermeasure process against malware and suppresses access to the link. The technology disclosed in PTL 6 is able to delete, edit, and move a created link file.

PTL 7 (Japanese Translation of PCT International Application Publication No. 2013-507722) discloses a technology of detecting malware in accordance with behavior of a specific file executed on an information processing apparatus. The technology disclosed in PTL 7 adjusts an aggression level of a specific file in accordance with a rate of spread (a degree of distribution in an actual network environment) of the file. The technology disclosed in PTL 7 determines whether behavior of a specific file corresponds to behavior of malware, by use of an aggression level with respect to the file.

PTL 8 (Japanese Unexamined Patent Application Publication No. 2011-154727) discloses a technology of allowing malware to access a virtual network and acquiring information about an operation and communication executed by the malware. The technology disclosed in PTL 8 executes malware in a malware execution environment connected to a virtual network unit. The virtual network unit receives communication from the malware execution environment, analyzes a communication protocol, generates an appropriate response corresponding to the protocol, and transmits the response to the malware execution environment. In accordance with a content of communication from the malware execution environment, the technology disclosed in PTL 8 connects such communication to an actual Internet environment.

PTL 9 (Japanese Unexamined Patent Application Publication No. 2013-105366) discloses a technology of adjusting a time progression rate in an execution environment of a program being active only at a specific timing or a date and time, in order to analyze such a program.

In addition, there is a reference as follows related to a technology of decoding encrypted data.

PTL 10 (Japanese Unexamined Patent Application Publication No. 2007-116752) discloses a technology of confirming correctness of decoded data obtained by decoding a ciphertext. When decoding data encrypted by use of a pseudorandom number, the technology disclosed in PTL 10 determines correctness of the decoded data by comparing entropy of the decoded data with a specific reference value.

CITATION LIST

Patent Literature

[PTL1] Japanese Translation of PCT International Application Publication No. 2014-514651
[PTL2] Japanese Unexamined Patent Application Publication No. 2013-114637
[PTL3] Japanese Translation of PCT International Application Publication No. 2012-511847
[PTL4] Japanese Unexamined Patent Application Publication No. 2009-037545
[PTL5] Japanese Unexamined Patent Application Publication No. 2006-279938
[PTL6] Japanese Translation of PCT International Application Publication No. 2013-508823
[PTL7] Japanese Translation of PCT International Application Publication No. 2013-507722
[PTL8] Japanese Unexamined Patent Application Publication No. 2011-154727
[PTL9] Japanese Unexamined Patent Application Publication No. 2013-105366
[PTL10] Japanese Unexamined Patent Application Publication No. 2007-116752

SUMMARY OF INVENTION

Technical Problem

As described above, when analyzing cryptographic communication executed by malware and the like in an information processing apparatus, it is required to acquire information (for example, a key) used for decoding encrypted communication data.

For example, it is expected that the aforementioned live forensics technique is able to acquire a content of a memory space (data stored in a memory space) in an information communication apparatus at a specific timing. Accordingly, it is conceivable to extract a key existing in the memory space by analyzing the acquired information about the memory space.

However, for example, when various types of monitoring programs and the like (may be hereinafter referred to as "agents") are executed on an information communication apparatus which is an investigation target, in order to extract a key existing in a memory space, malware may detect execution of such programs. When malware detects execution of an agent, the malware pauses an activity of the malware itself and erases a trace of the activity including the malware itself. When an evasive activity for preventing analysis of malware is taken as described above, it becomes difficult to analyze the malware itself or cryptographic communication executed by the malware. Consequently, an agentless analysis technology not executing an agent on an information communication apparatus as investigation target is required.

Further, it is assumed a case that data stored in a memory space (may be referred to as second data) of an information communication apparatus are acquired by use of the live forensics technique. In this case, a technology for extracting, from the acquired data, data corresponding to a key which enables to decrypt communication data (may be referred to as first data). A recent information communication apparatus often includes an enormous memory space, and it may take an long time when extracting data corresponding to the key by fully searching data stored in the memory space. In addition, when an encryption algorithm, or an encryption parameter such as a size of a key used for encryption processing is unknown, it is required to consider combinations of them, for extracting a candidate of the key. That is, there is a demand for a technology that enables to extract efficiently, from second data potentially having an enormous size, an encryption key which enables to decrypt (decode) encrypted first data.

On the contrary, each technology disclosed in PTLs 1, 2, 4, 6, 7, and 8 analyzes malware by introducing a monitoring methods, an execution trace methods, and the like (agents) into an information communication apparatus. Accordingly, the malware may detect analysis processing by such agents and takes an evasive activity for preventing analysis of the malware itself. Specifically, the technology disclosed in PTL 2 extracts an encryption key by analyzing an execution process of malware, and therefore it is difficult to extract the encryption key when the malware takes an evasive activity for preventing analysis of the malware itself.

Further, the technology disclosed in PTL 3 does not decrypt cryptographic communication by malware and the like. Accordingly, it is difficult to apply such a technology to analysis of cryptographic communication executed by malware.

Each technology disclosed in PTLs 4, 6, and 7 is a technology of analyzing behavior of malware and does not sufficiently consider analysis of encrypted communication by the malware.

The technology disclosed in PTL 5 assumes that an encryption key used in encrypted communication can be shared in advance, and therefore it is difficult to analyze encrypted communication by malware, in which an encryption key is unknown.

The technology disclosed in PTL 8 does not sufficiently consider a case that malware executes encrypted communication.

The technology disclosed in PTL 10 only determines whether a decoding result of a ciphertext is successful or not, and does not sufficiently consider extraction of an encryption key required for decryption of such a ciphertext.

Consequently, when the technology disclosed in each of the aforementioned PTLs is employed, for example, it is difficult to properly check cryptographic communication executed by malware while reducing a possibility of being detected by the malware itself.

The present invention is made in view of the situation as described above.

A main object of the present invention is to provide an analysis system and the like that are able to efficiently extract, from second data, in accordance with a specific criterion, a candidate of a correct encryption key which first data encrypted by a specific encryption scheme can be decrypted (decoded). For example, the first data may be the aforementioned encrypted communication data. Further, for example, the second data may be data stored in the aforementioned memory space.

Solution to Problem

To achieve the object, an analysis system according to one aspect of the present invention is configured as follows. That is, the analysis system according to one aspect of the present invention includes: a processing circuitry configured to function as a cryptanalysis processing unit. The cryptanalysis processing unit including: a key candidate extraction unit that is configured to extract, from second data, one or more candidates of key data that include an encryption key that enables to decrypt first data encrypted by a specific encryption scheme, based on data indicating a feature of the key data; and a decryption unit that is configured to extract, from the extracted candidates of key data, correct key data that enables to correctly decrypt the encrypted first data, based on a result of decrypting the first data by use of the extracted candidates of key data.

An analysis method according to one aspect of the present invention is configured as follows. That is, an analysis method according to one aspect of the present invention includes: by an information processing apparatus, extracting, from second data, one or more candidates of key data that include an encryption key that enables to decrypt first data encrypted by a specific encryption scheme, based on data indicating a feature of the key data; and extracting, from one or more of the candidates of key data, correct key data that enables to correctly decrypt the encrypted first data, based on a result of decrypting the first data by use of the extracted candidates of key data.

Further, the object is also achieved by an analysis system including the aforementioned configuration, a computer program providing a corresponding analysis method by a computer, and a computer readable storage medium and the like storing the computer program.

Advantageous Effects of Invention

The present invention enables to efficiently extract, from second data, in accordance with a specific criterion, a candidate of a correct encryption key which first data encrypted by a specific encryption scheme can be decrypted (decoded).

BRIEF DESCRIPTION OF DRAWINGS

FIG. 4 is a diagram illustrating a specific example of a key data acquisition policy according to the first example embodiment of the present invention.

FIG. 7 is a diagram illustrating a specific example of key candidate determination information according to the first example embodiment of the present invention.

FIG. 8 is a diagram illustrating a specific example of a key candidate storing unit according to the first example embodiment of the present invention.

DESCRIPTION OF EMBODIMENTS

In the following, example embodiments of the present invention will be described in detail with reference to the drawings. Configurations described in the following example embodiments are merely exemplifications and the technical scope of the present invention is not limited thereto.

An analysis system described in the respective example embodiments may be configured as a system including one or more components of the system which are provided by use of a plurality of physically or logically separated apparatuses (for example, a physical information processing apparatus and a virtual information processing apparatus). In this case, such a plurality of apparatuses may be communicably connected by use of a wired communication network, a wireless communication network, or any combination of both. Further, when such a plurality of apparatuses are configured by virtual information processing apparatuses and the like, the communication network may be a virtual communication network.

The analysis system described in the respective example embodiments may also be configured as a system in which all components of the system are provided by use of one apparatus (for example, a physical information processing apparatus or a virtual information processing apparatus).

<First Example Embodiment>

Figure 1:
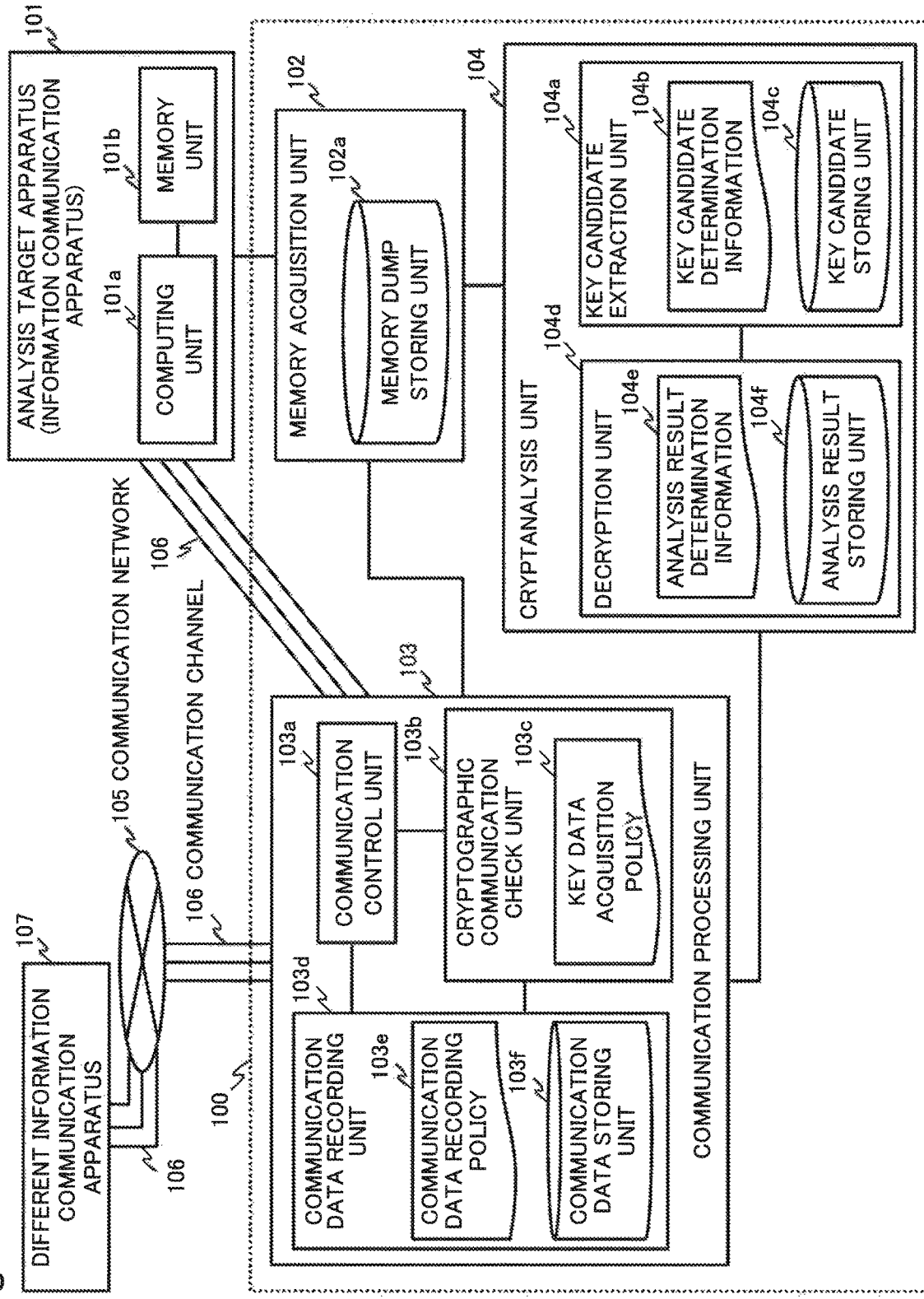
FIG. 1 is a block diagram illustrating functional configurations of an analysis system, an analysis target apparatus, and the like, according to a first example embodiment of the present invention.
Figure 2:
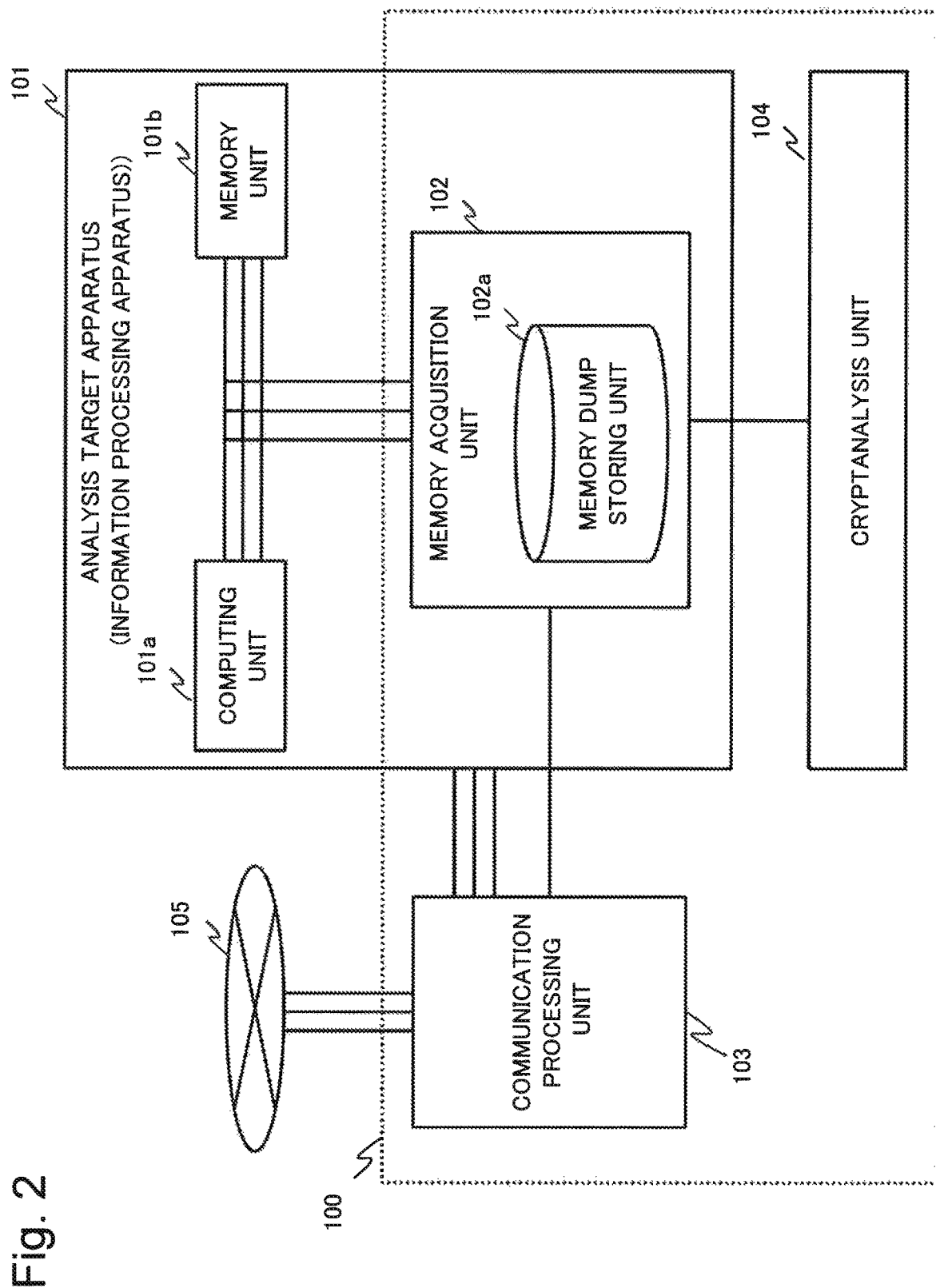
FIG. 2 is a diagram illustrating a first configuration example capable of providing the analysis target apparatus and a memory acquisition unit, according to the first example embodiment of the present invention.
Figure 3:
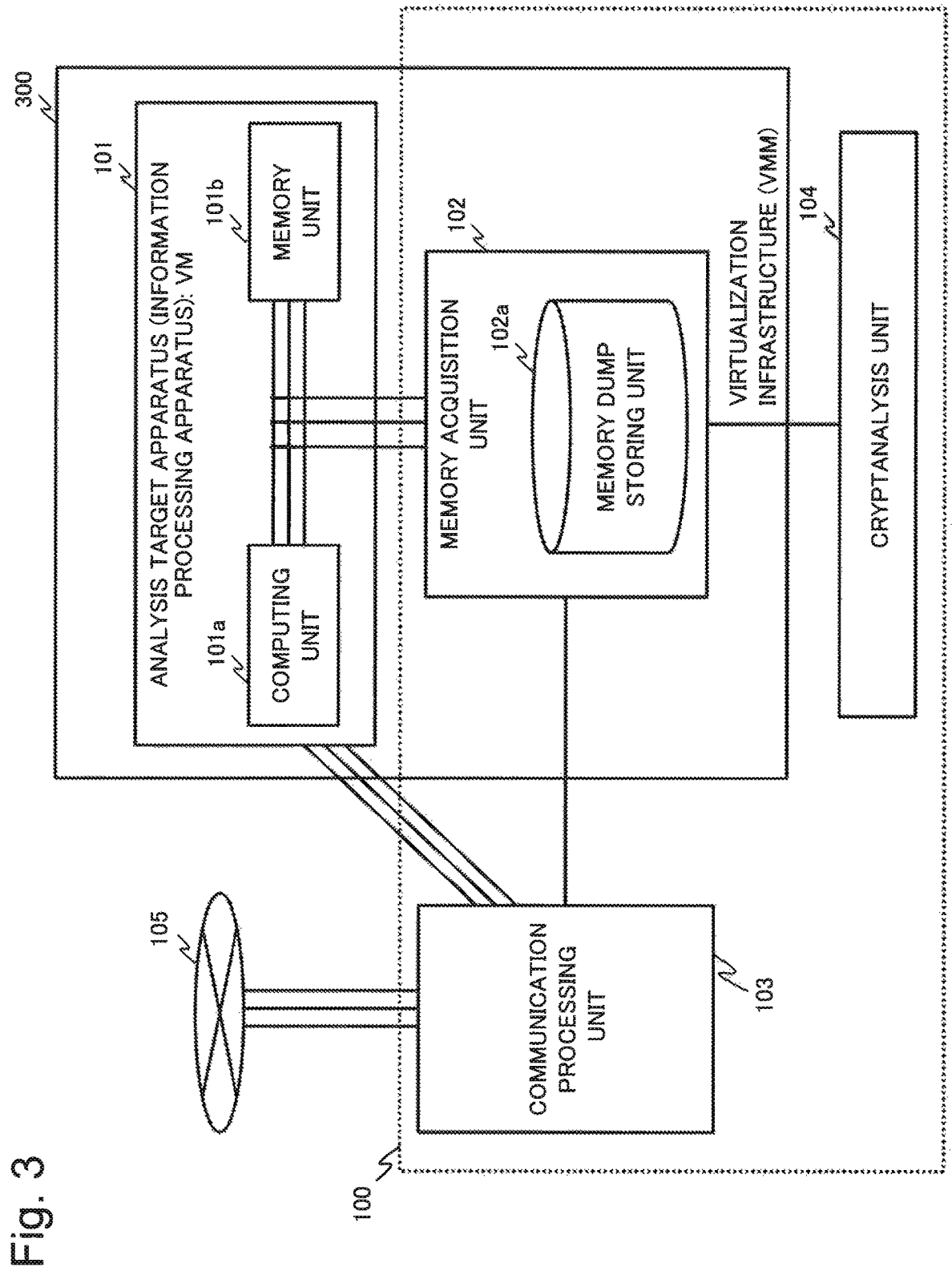
FIG. 3 is a diagram illustrating a second configuration example capable of providing the analysis target apparatus and the memory acquisition unit, according to the first example embodiment of the present invention.

A first example embodiment of the present invention will be described below. First, an analysis system according to the present example embodiment will be described with reference to FIGS. 1 to 3. FIG. 1 is a block diagram illustrating a functional configuration of the analysis system 100 according to the present example embodiment. FIGS. 2 and 3 are diagrams illustrating configuration examples capable of providing an analysis target apparatus 101 and a memory acquisition unit 102, according to the present example embodiment.

First, the analysis target apparatus 101 according to the present example embodiment will be described. The analysis target apparatus 101 is an apparatus as an analysis target to be analyzed by the analysis system 100 according to the present example embodiment.

As exemplified in FIG. 1, the analysis target apparatus 101 according to the present example embodiment is any information communication apparatus including at least a computing unit 101a and a memory unit 101b, and being communicably connected to a communication network 105 through a communication channel 106.

For example, the analysis target apparatus 101 may be an information communication apparatus configured by use of physical hardware, such as a computer. The analysis target apparatus 101 may also be a virtual computer (virtual machine [VM]) or the like provided in a predetermined virtualization infrastructure capable of virtualizing various types of hardware such as an information processing apparatus.

For example, such a virtualization infrastructure may be provided in an environment built by use of a plurality of information processing apparatuses mutually connected by a communication network (for example, a cloud computing environment), or may be provided in an environment built by use of one information processing apparatus.

For example, such a virtualization infrastructure may be provided as a software program executed on a specific host operating system (OS), or may be provided as a software program implemented between hardware of an information processing apparatus and an OS.

Further, such a virtualization infrastructure may be provided by use of a function of a physical hardware device, or may be provided by use of a combination of a function of a hardware device (for example, various types of virtualization support functions of a central processing unit [CPU]) and a software program.

For example, Hyper-V provided by Microsoft (registered trademark) may be employed as such a virtualization infrastructure; however, such a virtualization infrastructure is not limited thereto.

The analysis target apparatus 101 is not limited to various types of computers and the like, and may be any equipment connectable to a communication network, such as a mobile phone (including a smartphone), a personal digital assistant (PDA), a game machine, tablet-type information equipment, a printer, a digital multifunction apparatus, and various types of network equipment (for example, a switch, a router, and an access point).

For example, the computing unit 101a is a computing device, such as a central processing unit (CPU) and a micro-processing unit (MPU), that reads various types of data and programs (computer programs) stored in the memory unit 101b and executes various types of computing processing implemented in the program. The computing unit 101a may be a physical computing device configured by use of specific hardware (an integrated circuit). The computing unit 101a may also be a virtual computing device (a virtual CPU) in a virtualization infrastructure virtualizing the hardware, as exemplified in FIG. 3.

For example, the memory unit 101b functions as a main memory in the analysis target apparatus 101 and stores various types of programs, data, and the like processed in the computing unit 101a. Such a memory unit 101b may be a physical memory apparatus composed of specific hardware (for example, an integrated circuit), such as a dynamic random access memory (DRAM) composed of a dual inline memory module (DIMM). Further, the memory unit 101b may be a virtual memory apparatus provided in the aforementioned predetermined virtualization infrastructure.

With regard to the memory unit 101b according to the present example embodiment, data stored in the memory unit 101b (may be hereinafter referred to as "memory area data") can be acquired (dumped) from outside the memory unit 101b. As for a specific method of memory-dumping, a known technology may be appropriately selected. For example, a method of acquiring memory area data saved in a nonvolatile storage apparatus by use of a hibernation function of an operating system (OS), and a method of acquiring memory area data paged out in a virtual storage provided by an OS may be employed as such a method.

Without being limited to the above, for example, when the memory unit 101b is configured with physical hardware, memory area data may be acquired by acquiring data transmitted and received on a communication bus or the like connecting the computing unit 101a and the memory unit 101b. Further, memory area data may be acquired by outputting (memory-dumping) an entire storage area in the memory unit 101b at a particular timing. In this case, for example, memory area data can be acquired by use of a function of a memory controller (unillustrated) that is configured to control reading, writing, accessing, and the like of data with respect to the memory unit 101b.

When the memory unit 101b is configured as a virtual memory apparatus, data stored in the memory unit 101b can be acquired through a function provided by a virtualization infrastructure (for example, a specific application programming interface [API]) and data provided by the virtualization infrastructure (for example, information by which a saved area of data stored in a virtual memory unit can be specified). As for a specific implementation of such processing, a known technology may be appropriately employed depending on a specific configuration of the virtualization infrastructure, and therefore detailed description is omitted.

The analysis target apparatus 101 according to the present example embodiment executes cryptographic communication with the communication network 105 through the communication channel 106. More specifically, the analysis target apparatus 101 executes cryptographic communication with a different information communication apparatus 107 communicably connected through the communication network 105.

In this case, a program executed on the analysis target apparatus 101 may provide cryptographic communication with the different information communication apparatus 107. Such a program is not limited to a regular program executed on the analysis target apparatus 101. Such a program may include malware described above.

For example, in such cryptographic communication, as for a cryptographic communication protocol encrypting a communication channel between the analysis target apparatus 101 and the communication network 105 (the different information communication apparatus 107), a cryptographic communication protocol such as SSL, SSH, or IPSec may be employed. A specific example of a case that SSL is used as such a cryptographic communication protocol will be described in the respective example embodiments described below including the present example embodiment. The analysis system 100 according to the present example embodiment is not limited to SSL and may be applied to a different cryptographic communication protocol.

The communication network 105 is a communication network being configured by use of a wired communication network, a wireless communication network, or any combination of both, and being capable of establishing a communication channel by use of any communication protocol. Such a communication network 105 may be a wide area communication network such as the Internet, an on-the-premises communication network such as a local area network (LAN), or a combination of both.

Further, a communication protocol used in the communication network 105 may be a known communication protocol such as Transmission Control Protocol/Internet Protocol (TCP/IP). For example, the communication network 105 is able to provide the analysis target apparatus 101 with a communication channel encrypted by various types of cryptographic communication protocols described above. Such a communication network 105 can be configured by a known technology or a combination of known technologies, and therefore detailed description is omitted.

The different information communication apparatus 107 is communicably connected to the analysis target apparatus 101 through the communication network 105. For example, the different information communication apparatus 107 may be an information communication apparatus composed of physical hardware, such as a computer. Further, the different information communication apparatus 107 may be a virtual computer and the like provided in a predetermined virtualization infrastructure.

The different information communication apparatus 107 is not limited to various types of computers and the like, and for example, may be a mobile phone (including a smartphone), a PDA, a game machine, tablet-type information equipment, a printer, a digital multifunction apparatus, various types of network equipment, and any equipment connectable to a communication network.

For example, the different information communication apparatus 107 executes cryptographic communication with the analysis target apparatus 101 by use of a cryptographic communication protocol as exemplified above. Such a different information communication apparatus 107 can be configured by a known technology or a combination of known technologies, and therefore detailed description is omitted.

(Configuration of Analysis System 100)

Next, components of the analysis system 100 according to the present example embodiment will be described.

The analysis system 100 according to the present example embodiment includes the memory acquisition unit 102, a cryptanalysis unit 104, and a communication processing unit 103 as main components (the memory acquisition unit 102, the cryptanalysis unit 104, the communication processing unit 103, and components constituting the units may be hereinafter simply referred to as "components of the analysis system 100").

By use of the components, the analysis system 100 according to the present example embodiment analyzes cryptographic communication executed between the analysis target apparatus 101 and the different information communication apparatus 107 connected through the communication network 105. Then, the analysis system 100 according to the present example embodiment executes specific processing in accordance with the analysis result.

Each component of the analysis system 100 may be provided by use of an information processing apparatus such as a physical computer, or may be provided by use of a VM provided in a virtualization infrastructure. The respective components of the analysis system 100 are communicably connected by a wireless communication line, a wired communication line, or any combination of both. Such a communication line may employ a known technology, and therefore detailed description is omitted. Each component of the analysis system 100 will be described below.

The cryptanalysis unit 104 described below is one of main components with regard to the present invention in a case that the present example embodiment is described as a specific example.

(Configuration of Memory Acquisition Unit 102)

First, the memory acquisition unit 102 according to the present example embodiment will be described. The memory acquisition unit 102 according to the present example embodiment is communicably connected to the analysis target apparatus 101. The memory acquisition unit 102 acquires memory area data stored in the memory unit 101b in the analysis target apparatus 101. The memory acquisition unit 102 includes a memory dump storing unit 102a that stores acquired memory area data.

When the analysis target apparatus 101 is implemented by use of an information communication apparatus such as a physical computer, for example, the memory acquisition unit 102 may be provided as an extended hardware device connected to the memory unit 101b through various types of communication buses and the like, as exemplified in FIG. 2. The memory acquisition unit 102 may also be connected to a memory controller (unillustrated) controlling read, write, access, and the like of data with respect to the memory unit 101b.

In this case, for example, the memory acquisition unit 102 may acquire data stored in the memory unit 101b through the memory controller (unillustrated) controlling read and write of data with respect to the memory unit 101b. Reference 1 below discloses a technology of acquiring a content of a memory apparatus (synchronous dynamic random access memory [SDRAM]) implemented on a computer, by expansion hardware connected to a Peripheral Components Interconnect (PCI) bus.

(Reference 1)

Brian D. Carrier, Joe Grand, "A hardware-based memory acquisition procedure for digital investigations," Digital Investigation Volume 1, Issue 1, February 2004, pp. 50 to 60

Assume a case where the analysis target apparatus 101 is provided by use of a VM or the like provided by a virtualization infrastructure. In this case, for example, the memory acquisition unit 102 may be provided by use of a function of a virtual machine monitor (VMM) 300 provided in the virtualization infrastructure, which is software capable of controlling an operation of a VM, as exemplified in FIG. 3. More specifically, the memory acquisition unit 102 may be provided by software (a software program) or a virtual device, utilizing a function of the VMM 300.

In this case, as described above, the memory acquisition unit 102 is able to acquire (dump) data stored in the memory unit 101b through a function (for example, a specific API) and data (for example, information which can be used to specify a saved area of data stored in the virtual memory unit 101b) respectively provided by the VMM. As for a specific method of acquiring memory area data, a known technology may be appropriately employed depending on a configuration of the memory unit 101b.

Further, without being limited to aforementioned FIGS. 2 and 3, for example, the memory acquisition unit 102 may be provided by incorporating a memory dump function by hardware, software, or a combination of hardware and software into the analysis target apparatus 101 itself. In this case, for example, the memory acquisition unit 102 may be provided as any software executed on the analysis target apparatus. The memory acquisition unit 102 itself does not execute analysis processing of malware or communication by malware. Therefore risk of being detected by malware is relatively low.

For example, the memory acquisition unit 102 accepts a dump instruction instructing acquisition of memory area data stored in the memory unit 101b from the communication processing unit 103 (a cryptographic communication check unit 103b in particular) to be described later. The memory acquisition unit 102 dumps memory area data stored in the memory unit 101b at a timing of accepting the dump instruction.

The memory acquisition unit 102 may dump all memory area data (for example, data stored in the entire memory area in the memory unit 101b) stored in the memory unit 101b. The memory acquisition unit 102 may also dump at least part of memory area data out of data stored in the memory unit 101b.

The memory acquisition unit 102 saves (registers) dumped memory area data into a memory dump storing unit 102a to be described later.

When processing of dumping memory area data from the memory unit 101b is completed, the memory acquisition unit 102 may notify completion of the processing to the communication processing unit 103 (the cryptographic communication check unit 103b in particular) to be described later.

The memory dump storing unit 102a stores memory area data acquired by the memory acquisition unit 102. The memory dump storing unit 102a may store memory area data acquired from the memory unit 101b and information indicating a timing at which the memory area data are acquired, in association with each other.

(Configuration of Communication Processing Unit 103)

Next, the communication processing unit 103 according to the present example embodiment will be described. First, an overview of the communication processing unit 103 according to the present example embodiment will be described.

The communication processing unit 103 is arranged between the analysis target apparatus 101 and the communication network 105, and is communicably connected to each of them through the communication channel 106. The communication processing unit 103 relays communication data between the analysis target apparatus 101 and the communication network 105 in accordance with an analysis result of communication data transmitted and received between the analysis target apparatus 101 and the communication network 105. In particular, the communication processing unit 103 according to the present example embodiment is able to relay communication data related to cryptographic communication using a predetermined cryptographic communication protocol executed between the analysis target apparatus 101 and the communication network 105.

The communication processing unit 103 instructs the memory acquisition unit 102 to acquire memory area data saved in the memory unit 101b in the analysis target apparatus 101, in accordance with the analysis result of the communication data. On this occasion, the communication processing unit 103 may control suspending and resuming of communication between the analysis target apparatus 101 and the communication network 105.

Further, the communication processing unit 103 saves the communication data in accordance with the analysis result of the communication data.

For example, the communication processing unit 103 may be network equipment, such as a router, a switch, or an access point, that includes a communication interface connected to a plurality of communication channels 106. In addition, the communication processing unit 103 may be an information processing apparatus which is able to provide a function of the network equipment, such as a computer. Such a communication processing unit 103 may be implemented as network equipment or an information processing apparatus which is a physical apparatus. Such a communication processing unit 103 may also be provided as a virtual device virtualizing network equipment or an information processing apparatus in a specific virtualization infrastructure.

A specific configuration of the communication processing unit 103 will be described below.

The communication processing unit 103 includes a communication control unit 103a and the cryptographic communication check unit 103b as exemplified in FIG. 1. The communication processing unit 103 may include a communication data recording unit 103d. The communication control unit 103a, the cryptographic communication check unit 103b, and the communication data recording unit 103d are communicably connected with one another.

Each component of the communication processing unit 103 will be described below.

As described above, the communication control unit 103a relays communication between the analysis target apparatus 101 and the communication network 105. More specifically, the communication control unit 103a relays communication between the analysis target apparatus 101 and the different information communication apparatus 107 connected through the communication network 105. It is hereinafter assumed that communication between the analysis target apparatus 101 and the communication network 105 includes communication between the analysis target apparatus 101 and the different information communication apparatus 107 connected through the communication network 105. Communication between the analysis target apparatus 101 and the communication network 105 may be encrypted by a specific cryptographic communication protocol (for example, SSL).

The communication control unit 103a captures communication data transmitted from the analysis target apparatus 101 and analyzes a communication content represented by the communication data (for example, destination information or information about a communication protocol). The communication control unit 103a captures communication data received from the communication network 105 and analyzes a content thereof (for example, destination information or information about a communication protocol). The communication control unit 103a transfers each piece of communication data between the communication network 105 and the analysis target apparatus 101 in accordance with the analysis results.

As an example, assume a case where the communication network 105 is a network employing the Internet Protocol (IP) (IP network) such as the Internet. In this case, by analyzing IP packets constituting communication data, the communication control unit 103a is able to transfer the communication data between the communication network 105 and the analysis target apparatus 101. As for such transfer control of communication data, a technology similar to that employed by known network equipment such as a router and a switch can be employed, and therefore detailed description is omitted.

The communication control unit 103a is able to suspend communication between the analysis target apparatus 101 and the communication network 105 and is also able to resume the suspended communication. More specifically, the communication control unit 103a is able to control suspending and resuming of communication between the analysis target apparatus 101 and the different information communication apparatus 107 connected through the communication network 105.

For example, the communication control unit 103a controls suspending and resuming of writing (or reading) communication data with respect to an unillustrated network interface connected to the communication channel 106 connected to the communication network 105 or the analysis target apparatus 101. Consequently, the communication control unit 103a is able to control communication between the analysis target apparatus 101 and the communication network 105. As for the control technology of writing (or reading) communication data with respect to a network interface, a known technology may be appropriately employed depending on a specific configuration of the network interface or the communication processing unit 103, and therefore detailed description is omitted.

The communication control unit 103a may suspend communication between the analysis target apparatus 101 and the communication network 105 in accordance with a request from the cryptographic communication check unit 103b to be described later. Similarly, the communication control unit 103a may resume the suspended communication in accordance with a request from the cryptographic communication check unit 103b to be described later.

The communication control unit 103a provides (delivers) the captured communication data to the cryptographic communication check unit 103b to be described later. Similarly, the communication control unit 103a may provide (deliver) the captured communication data to the communication data recording unit 103d to be described later.

Next, the cryptographic communication check unit 103b will be described.

The cryptographic communication check unit 103b analyzes communication data accepted from the communication control unit 103a. The cryptographic communication check unit 103b determines a timing at which data including confidential information used for encryption of a communication channel in the cryptographic communication protocol exist in the memory unit 101b in the analysis target apparatus 101, in accordance with the analysis result and a key data acquisition policy 103c to be described later.

Such data including confidential information are generally data (may be hereinafter referred to as "key data") including a key (may be hereinafter referred to as an "encryption key") used for encryption of a communication channel. Such an encryption key is a key which can be used to encrypt or decode (decrypt) communication data transmitted and received in an encrypted communication channel.

In other words, by analyzing communication data transmitted and received in accordance with a specific cryptographic communication protocol, the cryptographic communication check unit 103b determines whether or not key data including an encryption key exist in the memory unit 101b in the analysis target apparatus 101. More specifically, by analyzing the communication data, the cryptographic communication check unit 103b may determine a timing at which the key data exist in the memory unit 101b in the analysis target apparatus 101.

For example, in a cryptographic communication protocol such as SSL/TLS, progress of a procedure of exchanging an encryption key used for encryption of a communication channel can be checked by analyzing communication data.

Specifically, in a cryptographic communication protocol such as SSL/TLS, an encryption key itself (or information from which an encryption key can be derived) exchanged between two or more communication terminals is protected (encrypted) by use of a technology such as a public key infrastructure (PKI). Accordingly, it is difficult for a third party to acquire the encryption key itself (or the information from which the encryption key can be derived) through the communication channel.

However, by analyzing an unencrypted part in communication data, the cryptographic communication check unit 103b is able to check information indicating progress of an exchange procedure of an encryption key in the cryptographic communication protocol. For example, assuming that the cryptographic communication protocol is SSL, in communication data, a header (Record header) in the Record protocol and part of messages in the handshake protocol are not encrypted. Accordingly, for example, by analyzing the part in communication data, the cryptographic communication check unit 103b is able to check progress of the processing procedure of exchanging an encryption key in the SSL protocol.

For example, in the SSL protocol, when a predetermined procedure is executed (specifically, when a ChangeCipherSpec message is transmitted and received), an encryption key encrypting a communication channel is shared by two communication terminals. In other words, it is highly likely that a memory unit in the communication terminal (for example, the analysis target apparatus 101) stores key data including such an encryption key at the timing when such an encryption key is shared. Consequently, by analyzing communication data transmitted and received in accordance with a specific cryptographic communication protocol, the cryptographic communication check unit 103b is able to determine a timing in which key data including an encryption key exist in the memory unit 101b in the analysis target apparatus 101.

Further, by analyzing communication data, the cryptographic communication check unit 103b may acquire various types of information (may be hereinafter referred to as a "cipher suite") used for encryption processing of a communication channel in the cryptographic communication protocol. For example, such a cipher suite includes information indicating an encryption algorithm, a key length of an encryption key, a cipher mode of operation (to be described later), and a message authentication scheme of communication data. For example, when the cryptographic communication protocol is the SSL protocol, by analyzing a ClientHello message and a ServerHello message, the cryptographic communication check unit 103b is able to specify an encryption algorithm and the like used for encryption of a communication channel.

The Record protocol, the handshake protocol, various types of messages, and the like used in the SSL protocol are known technologies, and therefore detailed description is omitted.

As described above, the cryptographic communication check unit 103b checks progress of the procedure of exchanging an encryption key between the analysis target apparatus 101 and the different information communication apparatus 107. Thus, the cryptographic communication check unit 103b determines a timing at which key data including the encryption key exist in the memory unit 101b in the analysis target apparatus 101. More specifically, the cryptographic communication check unit 103b determines a timing at which key data including the encryption key exist in the memory unit 101b in the analysis target apparatus 101, by use of information set to the key data acquisition policy 103c.

As exemplified in FIG. 4, the key data acquisition policy 103c includes a type of a specific cryptographic communication protocol (401 in FIG. 4) and a key data acquisition criterion (402 in FIG. 4). The key data acquisition criterion 402 is associated with the cryptographic communication protocol 401. The key data acquisition criterion 402 is information indicating a criterion which can be used to determine at least a timing at which the key data exist in the memory unit 101b in the analysis target apparatus 101.

Further, the key data acquisition policy 103c may additionally include a content of processing (403 in FIG. 4) executed by the cryptographic communication check unit 103b. The processing content 403 is associated with the cryptographic communication protocol 401. The processing content 403 is information indicating a content of processing executed by the cryptographic communication check unit 103b when the key data are determined to exist in the memory unit 101b in the analysis target apparatus 101, in accordance with the key data acquisition criterion 402.

For example, for each specific cryptographic communication protocol, the cryptographic communication protocol 401 may be set with an identifier (ID) by which the cryptographic communication protocol can be distinguished.

For example, information for determining the specific timing may be expressed by use of any machine interpretable form (format) for information processing apparatus (computer) and the like, and be registered in the key data acquisition criterion 402. The machine interpretable form may be arbitrarily determined, and, for example, may be a combination of specific symbols, an expression by a structured language, and the like.

For example, information indicating a content of processing executed by the cryptographic communication check unit 103b may be expressed in any machine interpretable form (format) and be registered in the processing content 403.

For example, when the cryptographic communication protocol is "SSL/TLS" as exemplified in FIG. 4, information representing a timing being "(after ChangeCipherSpec is transmitted from SSL/TLS server) and (before transmission and reception of Application Data start)" may be set in the key data acquisition criterion 402. When determining that the key data acquisition criterion 402 is satisfied, as a result of analyzing communication data, the cryptographic communication check unit 103b executes processing registered in the processing content 403.

For example, the key data acquisition criterion 402 may be set with information about a timing at which a specific condition related to an encryption key in a cryptographic communication protocol is satisfied. More specifically, the key data acquisition criterion 402 may be set with information about a timing at which an encryption key is shared between the analysis target apparatus 101 and the different information communication apparatus 107 in the specific cryptographic communication protocol 401. The key data acquisition criterion 402 may also be set with information about a timing at which specific procedure related to sharing of an encryption key is executed between the analysis target apparatus 101 and the different information communication apparatus 107 in the specific cryptographic communication protocol 401.

The key data acquisition policy 103c described above may be preset to the cryptographic communication check unit 103b by any technique.

The cryptographic communication check unit 103b refers to the key data acquisition policy 103c (the key data acquisition criterion 402 in particular) and determines whether or not key data including an encryption key exist in the memory unit 101b in the analysis target apparatus 101. When determining that key data including an encryption key exist in the memory unit 101b, the cryptographic communication check unit 103b may instruct the memory acquisition unit 102 described above to acquire memory area data.

That is, the cryptographic communication check unit 103b analyzes communication data and determines a timing at which key data including an encryption key exist in the memory unit 101b in the analysis target apparatus 101, in accordance with the key data acquisition policy 103c. It is highly likely that an encryption key exists in the memory unit 101b at the timing. Accordingly, at the timing, the cryptographic communication check unit 103b instructs the memory acquisition unit 102 to acquire memory area data. In this case, it is highly likely that the memory area data acquired by the memory acquisition unit 102 includes the encryption key.

Further, when determining that the key data exist in the memory unit 101b in the analysis target apparatus 101, the cryptographic communication check unit 103b is able to instruct the communication control unit 103a described above to (at least temporarily) suspend communication between the analysis target apparatus 101 and the communication network 105.

Assume that communication between the analysis target apparatus 101 and the communication network 105 is continued without being suspended. In this case, the key data may be lost from the memory unit 101b in the analysis target apparatus 101. Further, when the communication is continued without being suspended, the encryption key used for encryption of the communication channel may be changed depending on the communication protocol.

Accordingly, the cryptographic communication check unit 103b instructs the communication control unit 103a to suspend communication between the analysis target apparatus 101 and the communication network 105 at a timing of determining that the key data exist in the memory unit 101b. It is expected that the encryption key be stored in the memory unit 101b while the communication is suspended. Accordingly, it is expected that the key data be included in memory area data acquired by the memory acquisition unit 102 during this period.

In other words, the cryptographic communication check unit 103b may suspend such communication so that a period (time) in which the encryption key is stored in the memory unit 101b is extended. By acquiring memory area data after suspending the communication between the analysis target apparatus 101 and the communication network 105 at a timing when the key data exists in the memory unit 101b, memory area data highly likely including the key data can be acquired.

In a case that communication between the analysis target apparatus 101 and the communication network 105 is suspended when completion of acquisition processing of memory area data is notified by the memory acquisition unit 102, the cryptographic communication check unit 103b may instruct the communication control unit 103a to resume the communication.

The cryptographic communication check unit 103b may appropriately select a timing at which communication between the analysis target apparatus 101 and the communication network 105 is resumed. Specifically, the cryptographic communication check unit 103b may resume the communication when completion of acquisition of memory area data is notified by the memory acquisition unit 102. Further, for example, the cryptographic communication check unit 103b may resume the communication when completion of decryption of communication data is notified by the cryptanalysis unit 104 (to be described later). By controlling a resumption timing of the communication as described above, the cryptographic communication check unit 103b is able to minimize a time (period) in which the communication is suspended.

For example, when a suspension period of the communication is prolonged, a program executing communication processing in the analysis target apparatus may handle the prolongation as a communication error or the like, and processing by such a program may be abnormally terminated. When such a program is malware in particular, termination of processing by the malware makes it difficult to analyze behavior thereof. On the contrary, by minimizing a time (period) for suspending the communication, for example, behavior of malware can be analyzed while allowing the malware to continue some processing.

The cryptographic communication check unit 103b may instruct resuming of communication between the analysis target apparatus 101 and the communication network 105 when a specific time (for example, 30 sec) elapses after instructing suspension of the communication between the analysis target apparatus 101 and the communication network 105 to the aforementioned communication control unit 103a. The cryptographic communication check unit 103b may appropriately select a proper value as the specific time. For example, by calculating in advance a time required for the memory acquisition unit 102 to acquire memory area data from the memory unit 101b through a preliminary experiment and a simulation, the cryptographic communication check unit 103b is able to select a minimum value as the specific time.

Additionally, when completion of acquisition processing of memory area data is notified by the memory acquisition unit 102, the cryptographic communication check unit 103b may instruct the cryptanalysis unit 104 (to be described later) to decrypt communication data saved in the communication data recording unit 103d (to be described later). Further, at that time, the cryptographic communication check unit 103b may notify the cryptanalysis unit 104 of information about an encryption algorithm used in the aforementioned cryptographic communication protocol. Detailed processing related to decryption of communication data will be described later.

The cryptographic communication check unit 103b may receive notification indicating completion of decryption processing of communication data from the cryptanalysis unit 104 (a decryption unit 104d in particular) to be described later. At that time, when communication between the analysis target apparatus 101 and the communication network 105 is suspended, the cryptographic communication check unit 103b may instruct the communication control unit 103a to resume the communication.

The cryptographic communication check unit 103b checks (analyzes) communication data decrypted by the cryptanalysis unit 104 and executes specific processing in accordance with the analysis result. The cryptographic communication check unit 103b may appropriately select such specific processing.

For example, as such specific processing, the cryptographic communication check unit 103b may instruct the communication control unit 103a to suspend communication between the analysis target apparatus 101 and the communication network 105. Further, for example, as such specific processing, the cryptographic communication check unit 103b may modify data transmitted and received between the analysis target apparatus 101 and the communication network 105. Further, for example, the cryptographic communication check unit 103b may continue communication between the analysis target apparatus 101 and the communication network 105 as-is, so as not to be sensed by malware and the like. Such specific processing may be predetermined depending on decrypted communication data.

Next, the communication data recording unit 103d will be described.

The communication data recording unit 103d saves (registers) the communication data captured by the communication control unit 103a into a communication data storing unit 103f in accordance with a communication data recording policy 103e.

The communication data recording policy 103e is information used for determining whether or not communication data captured by the communication control unit 103a need to be saved.

Figure 5:
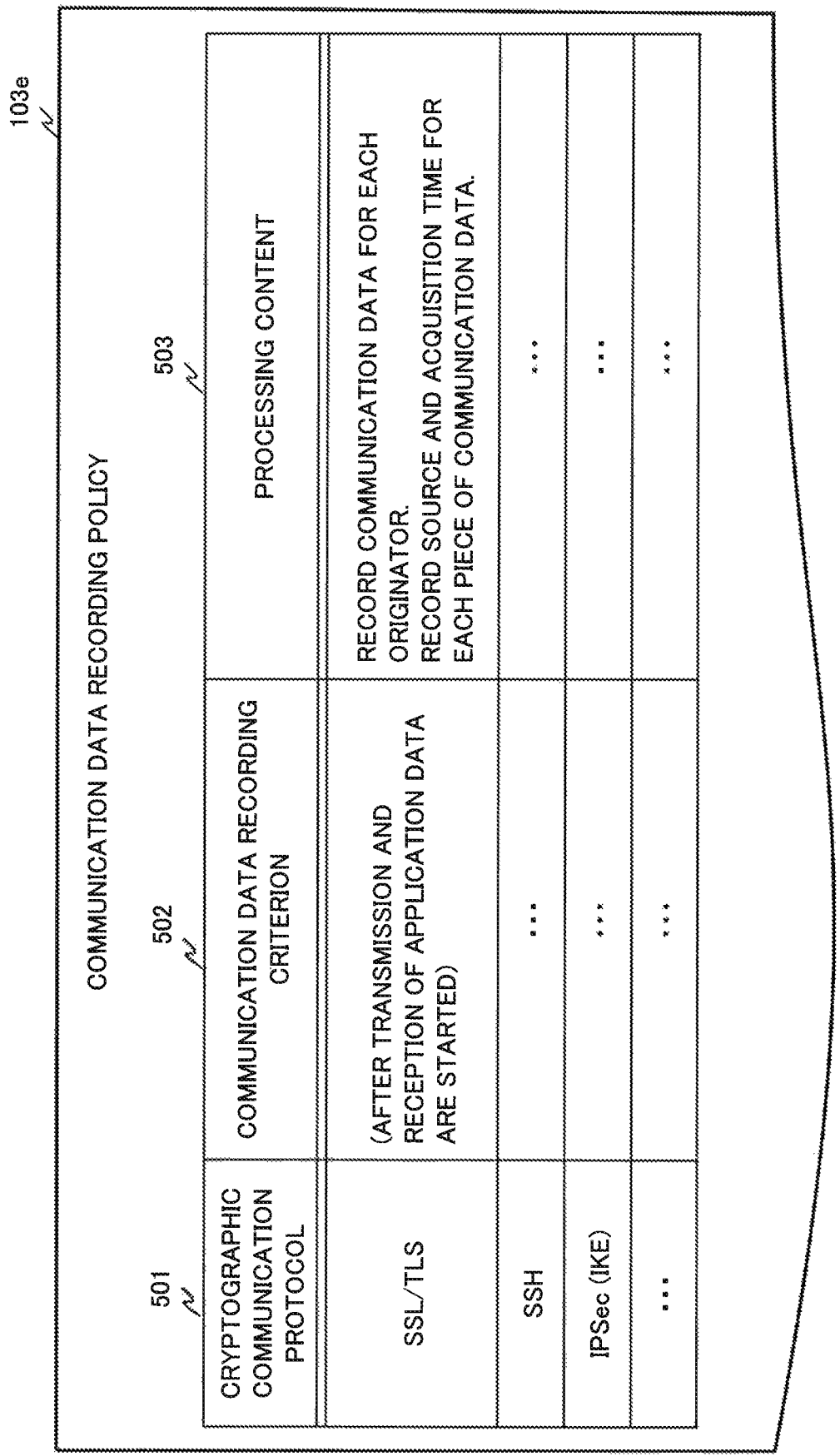
FIG. 5 is a diagram illustrating a specific example of a communication data recording policy according to the first example embodiment of the present invention.

More specifically, as exemplified in FIG. 5, the communication data recording policy 103e includes a type of a specific cryptographic communication protocol (501 in FIG. 5) and a communication data recording criterion (502 in FIG. 5). The communication data recording criterion 502 is associated with the cryptographic communication protocol 501. The communication data recording criterion 502 is a criterion (information) which can be used to determine whether or not communication data transmitted and received by use of the cryptographic communication protocol 501 need to be saved (recorded).

Further, the communication data recording policy 103e may additionally include a content of processing (503 in FIG. 5) executed by the communication data recording unit 103d. Such a processing content 503 is associated with the cryptographic communication protocol 501. The processing content 503 is information indicating a content of processing executed by the communication data recording unit 103d when the communication data recording criterion 502 is determined to be satisfied.

For example, for each specific cryptographic communication protocol, the cryptographic communication protocol 501 may be set with an identifier (ID) by which the cryptographic communication protocol can be distinguished.

For example, information which can be used to determine whether or not communication data need to be saved (recorded) may be expressed by use of any machine interpretable form (format), and be registered in the communication data recording criterion 502. More specifically, for example, information which can be used to determine whether or not a condition for saving communication data is satisfied, or which can be used to determine a timing to save communication data, may be registered in the communication data recording criterion 502.

For example, information indicating a content of processing executed by the communication data recording unit 103d, may be expressed by use of any machine interpretable form (format), and be registered in the processing content 503.

For example, when the cryptographic communication protocol is "SSL/TLS" as exemplified in FIG. 5, the communication data recording criterion 502 is set with information representing "(after transmission and reception of Application Data are started)". When determining that the communication data recording criterion 502 is satisfied as a result of analyzing communication data, the communication data recording unit 103d executes processing registered in the processing content 503.

For example, the communication data recording criterion 502 may be set with a condition indicating that the communication data recording unit 103d records data at or after a timing when the first (encrypted) communication data are transmitted and received on a communication channel encrypted by the cryptographic communication protocol 501.

As described above, depending on the cryptographic communication protocol, the encryption key used for encryption of a communication channel may be changed at a predetermined timing. In other words, in an encrypted communication channel, the encryption key for encrypting the communication channel may be different between the first communication data, and the second and subsequent communication data. Further, after the communication channel is encrypted, highly confidential information (highly important information) may be transmitted and received in the first communication data. Accordingly, when the communication channel is encrypted, it is effective to save the communication data at a timing when the first communication data are transmitted and received so that the cryptanalysis unit 104 (to be described later) is able to decrypt all cryptographic communication data.

Without being limited to the above, the communication data recording criterion 502 may be set with information by which any timing can be determined.

The communication data recording policy 103e described above may be preset to the communication data recording unit 103d by any technique.

The communication data recording unit 103d registers communication data determined to satisfy the communication data recording criterion 502 described above in the communication data storing unit 103f.

Figure 6:
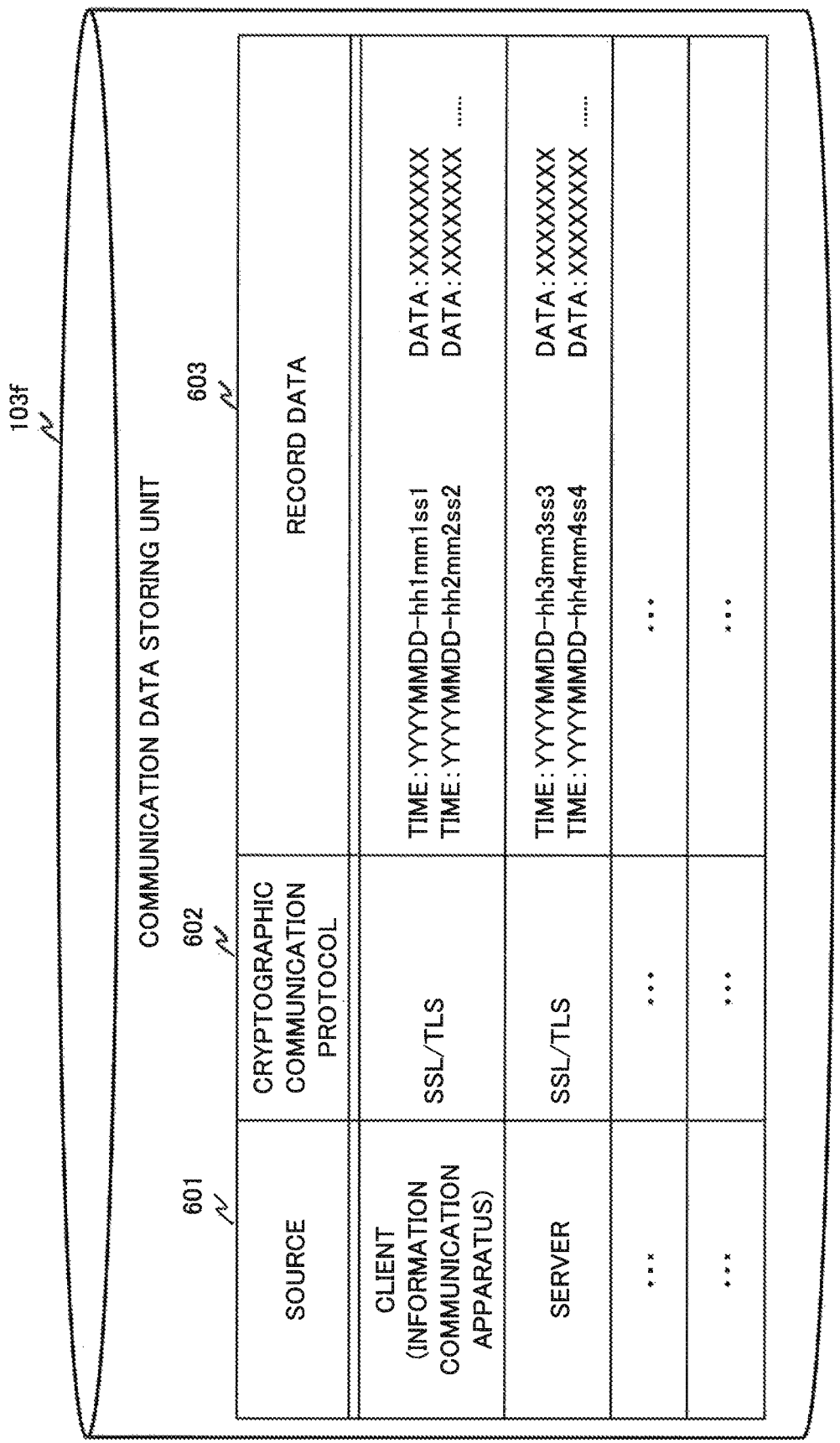
FIG. 6 is a diagram illustrating a specific example of a communication data storing unit according to the first example embodiment of the present invention.

For example, as exemplified in FIG. 6, for each piece of communication data, the communication data storing unit 103f stores information about the source of the communication data (601 in FIG. 6), identification information indicating the cryptographic communication protocol (602 in FIG. 6), and record data indicating the recorded communication data (603 in FIG. 6) in association with each other.

Information indicating a timing such as the capture time of the communication data, and the content of the communication data may be registered in the record data 603.

(Configuration of Cryptanalysis Unit 104)

Next, the cryptanalysis unit 104 according to the present example embodiment will be described. First, an overview of the cryptanalysis unit 104 according to the present example embodiment will be described.

The cryptanalysis unit 104 analyzes memory area data acquired by the aforementioned memory acquisition unit 102, and extracts a candidate of the aforementioned encryption key included in the memory area data, in accordance with information indicating a feature of key data (to be described later).

In accordance with a result of decoding encrypted communication data saved by the communication data recording unit 103*d*, by use of the extracted encryption key candidate, the cryptanalysis unit 104 extracts a correct encryption key out of the encryption key candidates. In this case, the correct encryption key is a key by which encrypted communication data can be correctly decoded. At this time, the cryptanalysis unit 104 may specify an encryption scheme (encryption algorithm) used in the aforementioned cryptographic communication protocol.

A specific configuration of the cryptanalysis unit 104 will be described below.

The cryptanalysis unit 104 includes a key candidate extraction unit 104*a* and the decryption unit 104*d*. These components constituting the cryptanalysis unit 104 are communicably connected to one another.

First, the key candidate extraction unit 104*a* according to the present example embodiment will be described. The key candidate extraction unit 104*a* includes a key candidate determination information 104*b* and a key candidate storing unit 104*c*.

The key candidate extraction unit 104*a* refers to memory area data registered in the memory dump storing unit 102*a* and extracts a candidate of the aforementioned encryption key from the memory area data in accordance with the key candidate determination information 104*b*. Specifically, the key candidate extraction unit 104*a* extracts a candidate of key data including a candidate of the encryption key used in cryptographic communication between the analysis target apparatus 101 and the communication network 105 from the memory area data, in accordance with the key candidate determination information 104*b*. The candidate of key data may be hereinafter referred to as a "key data candidate." When extracting a key data candidate, the key candidate extraction unit 104*a* may notify completion of the processing to the decryption unit 104*d* to be described later.

First, search of the aforementioned encryption key in the aforementioned memory area data by the key candidate extraction unit 104*a* will be described.

As described above, memory area data are data stored in the memory unit 101*b* in the analysis target apparatus 101 at a specific timing. In other words, a content of memory area data changes depending on a timing at which the memory acquisition unit 102 acquires the memory area data from the memory unit 101*b*. Accordingly, it is difficult to specify key data including the encryption key in the memory area data, in advance.

Further, when storage capacity (a size of a memory space) of the memory unit 101*b* in the analysis target apparatus 101 is large, a size of memory area data also becomes large. That is to say, the key candidate extraction unit 104*a* needs to search for an encryption key across a huge size of data. Assuming that a 128-bit encryption key is fully searched for across 1-gigabyte (GB) memory area data, a number of candidates becomes enormous, and therefore an efficient technique for extracting a key data candidate is required.

Key data including the encryption key often exhibit a characteristic feature in data included in the memory area data. For example, such a feature of key data represents an attribute of the key data themselves (for example, randomness of the data themselves) or an arrangement pattern (an arrangement position and a sequence of arranged data) of such key data in the memory area data.

The feature of key data varies depending on various types of conditions related to execution of cryptographic communication. For example, such conditions include an encryption scheme (encryption algorithm) used in the aforementioned cryptographic communication protocol, an encryption parameter (to be described later) used in the encryption scheme, and an execution environment (to be described later) of processing related to the encryption scheme in the analysis target apparatus 101. A specific example includes a case that, when a key length of an encryption key used in a specific encryption algorithm varies, the feature of key data may vary. Further, for example, since information required for encryption processing including the encryption key varies by a cipher mode of operation used in each encryption algorithm, the feature of key data may vary accordingly. The cipher mode of operation is a processing method in encryption of a plaintext longer than a block length when a block cipher is employed as an encryption algorithm.

The key candidate extraction unit 104*a* extracts data matching a specific feature of key data from the memory area data as a key data candidate. Thus, the key candidate extraction unit 104*a* is able to extract the aforementioned encryption key candidate.

For example, information (data) indicating the feature of key data can be collected in advance for each combination of the various types of conditions, in accordance with prior knowledge about an encryption algorithm, a preliminary experiment, or the like. Then, by extracting pattern from the collected data indicating the feature of key data, it is possible to provide determination information which can be used to extract the key data candidate from the memory area.

A specific method of collecting data indicating the feature of key data may be appropriately selected. For example, a user, a developer, an administrator, or the like (hereinafter referred to as a "user or the like") of the analysis system executes an experimental cryptographic communication program capable of outputting an encryption key on the analysis target apparatus 101. Then, for example, by use of the memory acquisition unit 102, the user or the like acquires memory area data in the analysis target apparatus 101 at a specific timing when the experimental communication program is executed. The user or the like searches the acquired memory area data for a (correct) encryption key output from the experimental program. By repeating such an experiment, a feature common to an area in which an encryption key is placed can be extracted. Further, for example, the user or the like is able to extract a feature characteristic of the key data in accordance with general knowledge about an encryption scheme (for example, a key length of an encryption key and randomness of an encryption key).

Further, for example, the user or the like may hook an API used for cryptographic communication in the analysis target apparatus 101 when executing the experimental program on the analysis target apparatus 101. By analyzing an argument passed to the hooked API, the user or the like obtains an encryption key and analyzes a feature of key data indicating the encryption key. Further, the user or the like investigates where in the memory unit 101*b* in the analysis target apparatus data indicating the encryption key are placed. The user or the like collects thus obtained investigation result as data indicating the feature of key data. The method of hooking an API is a known technology, and therefore detailed description is omitted.

The method of collecting data indicating the feature of key data is not limited to the aforementioned specific example, and any method may be employed.

As described above, by collecting and extracting pattern from data indicating a feature of key data in advance depending on the aforementioned various types of conditions, it is possible to provide determination information which can be used to extract the aforementioned key data candidate from memory area data. For example, such determination information may be set with a location (place) where a key data candidate is searched for (extracted) in memory area data, and a determination criterion by which whether or not specific data are key data can be determined.

The key candidate extraction unit 104a according to the present example embodiment extracts a key data candidate including the encryption key from memory area data by use of such determination information. More specifically, the key candidate extraction unit 104a extracts a key data candidate by use of the key candidate determination information 104b including determination information by which a key data candidate including the encryption key can be extracted.

As exemplified in FIG. 7, the key candidate determination information 104b includes information indicating a type of an encryption scheme (encryption algorithm) (701 in FIG. 7) and a key candidate determination criterion (704 in FIG. 7). The key candidate determination criterion 704 is associated with the encryption algorithm 701. Such key candidate determination criterion 704 is information which can indicate a criterion by which whether specific data included in memory area data corresponds to key data including the encryption key, can be determined. In other words, the key candidate determination criterion 704 is a criterion by which whether specific data included in memory area data corresponds to key data including the encryption key can be determined in accordance with data indicating a feature of key data.

Further, the key candidate determination information 104b may additionally include an encryption parameter related to the encryption algorithm (702 in FIG. 7), and information indicating an execution environment of encryption processing related to the encryption algorithm 701 in the analysis target apparatus 101 (703 in FIG. 7), respectively associated with the encryption algorithm 701.

For example, the encryption algorithm 701 may be set with an identifier (ID) by which a specific encryption algorithm can be distinguished.

For example, information being expressed by use of any machine interpretable form (format) may be registered in the key candidate determination criterion 704.

As exemplified in FIG. 7, the encryption parameter 702 may include information about a length of a key (key length) used in the encryption algorithm 701, and a cipher mode of operation. As described above, the cipher mode of operation is a processing method in encryption of a plaintext longer than a block length when a block cipher is employed as the encryption algorithm 701. For example, Cipher Block Chaining (CBC) mode and Galois/Counter Mode (GCM) are known as such an encryption mode.

For example, the execution environment information 703 is set with information about a library implemented with processing related to the encryption algorithm 701 in the analysis target apparatus 101, and information about an execution environment of the analysis target apparatus 101. More specifically, for example, the execution environment information 703 may be information by which an OS (for example, Windows [registered trademark] and Linux [registered trademark]) and an encryption processing implementation (for example, Cryptography Next Generation [CGN] API and OpenSSL) on the analysis target apparatus 101 can be specified.

The key candidate determination information 104b described above may be preset to the key candidate extraction unit 104a by any technique.

In accordance with the key candidate determination information 104b (the key candidate determination criterion 704 in particular) as described above, the key candidate extraction unit 104a determines whether or not to extract a specific data area in memory area data as a key candidate.

Extraction processing of the aforementioned key data candidate by the key candidate extraction unit 104a will be described below by use of a specific example illustrated in FIG. 7.

For example, as exemplified in FIG. 7, assume that an encryption algorithm 701 is "AES," a key length in an encryption parameter 702 is "128 bits" or "256 bits," and a cipher mode of operation in the encryption parameter 702 is "CBC."

In this case, the key candidate extraction unit 104a refers to a key candidate determination criterion 704 associated with the encryption algorithm 701 and the encryption parameter 702. Then, the key candidate extraction unit 104a extracts 16 or 32 consecutive bytes of data area with an entropy value greater than or equal to a specific reference value, from memory area data stored in the memory dump storing unit 102a.

In general, as entropy of values indicated by data included in a data area (may be hereinafter referred to as "entropy of data") becomes larger, a variation of the values indicated by the data included in the data area becomes larger. Further, an encryption key is often a random number value (in which a regularity cannot be found), and therefore values of key data including an encryption key is assumed to have a large variation. Accordingly, in accordance with the determination criterion as exemplified in FIG. 7, the key candidate extraction unit 104a is able to extract a data area including data having a large variation value as a key data candidate.

The magnitude of such a variation can be calculated by use of various known calculation methods. As a specific example, the key candidate extraction unit 104a may calculate a standard deviation (or variance) of a key data candidate as a magnitude of variation. A calculation method of a standard deviation (or variance) is a known technology, and therefore detailed description is omitted.

For example, as exemplified in FIG. 7, assume that an encryption algorithm 701 is "AES," a key length in an encryption parameter 702 is "128 bits," and a cipher mode of operation in the encryption parameter 702 is "GCM."

In this case, the key candidate extraction unit 104a refers to a key candidate determination criterion 704 associated with the encryption algorithm 701 and the encryption parameter 702, and extracts data determined to satisfy "560 consecutive bytes of data starting from 0x30, 0x02, 0x00, 0x00, 0x4b, 0x53, 0x53, 0x4D" from memory area data. For example, in a specific execution environment in the analysis target apparatus 101, key data including an encryption key may include a specific arrangement pattern. As exemplified in FIG. 7, by registering such an arrangement pattern as a key candidate determination criterion 704, the key candidate extraction unit 104a is able to extract data matching such an arrangement pattern as a key data candidate.

For example, the key candidate extraction unit 104a may extract a specific size of data by successive shifting by a specific size (for example, 1 byte) from a specific location (for example, the top) of memory area data, and determine whether or not the data correspond to a key candidate, in accordance with the key candidate determination criterion 704.

Assume that information about a cipher suite can be acquired from a result of analyzing communication data related to certain cryptographic communication by the cryptographic communication check unit 103b. In this case, information about the encryption algorithm 701 and the encryption parameter 702 respectively related to the cryptographic communication can be handled as known information confirmed by the communication data. The execution environment information 703 about the analysis target apparatus 101 can be handled as known information by a method such as presetting to the cryptanalysis unit 104.

When the encryption algorithm 701 and the encryption parameter 702 are unknown, the key candidate extraction unit 104a may extract a key data candidate conforming to each criterion by use of all key candidate determination criteria 704 registered in the key candidate determination information 104b. In this case, in accordance with a result of decrypting of encrypted communication data using the extracted key data candidate by the decryption unit 104d, to be described later, it is possible to specify key data including the key used for encryption of the communication data, an encryption algorithm, and an encryption parameter.

Further, in addition to extracting a key data candidate, the key candidate extraction unit 104a may acquire another piece of required information used for encryption or decoding processing of communication data (may be hereinafter referred to as "encryption processing data") in a specific cryptographic communication protocol.

For example, such encryption processing data may include the following data. Specifically, such encryption processing data may include an initialization vector (IV) in a case that a block cipher is used as an encryption algorithm. Such encryption processing data may also include various types of parameters (for example, a counter in a counter mode and a number used once (nonce) being a value for one time use) used in a specific cipher mode of operation. Such encryption processing data may also include authentication information assigned to encrypted communication data. Such encryption processing data are not limited to the above and may include any data required depending on an encryption algorithm, an encryption parameter, and the like.

For example, the key candidate extraction unit 104a may acquire such encryption processing data by acquiring communication data from the cryptographic communication check unit 103b or the communication control unit 103a and analyzing the communication data. Further, for example, similarly to the aforementioned key data candidate, the key candidate extraction unit 104a may acquire encryption processing data out of memory area data stored in the memory dump storing unit 102a in accordance with a specific determination criterion.

The key candidate extraction unit 104a saves (registers) a key data candidate extracted from memory area data into the key candidate storing unit 104c. Further, the key candidate extraction unit 104a may save (register) encryption processing data related to the key data candidate into the key candidate storing unit 104c.

As exemplified in FIG. 8, the key candidate storing unit 104c stores each encryption algorithm 801 associated with an extracted key data candidate 803. The key candidate storing unit 104c may store each encryption algorithm 801 associated with an encryption parameter 802 used in the encryption algorithm. The key candidate storing unit 104c may also store the key data candidate 803 including the aforementioned encryption processing data as part thereof. Without being limited to the above, the key candidate storing unit 104c may store the encryption processing data in an unillustrated area separate from the key data candidate 803.

As exemplified in FIG. 8, the key candidate storing unit 104c may store a plurality of key data candidates related to a specific encryption algorithm (for example, "AES"). The configuration exemplified in FIG. 8 is a specific example, and the key candidate storing unit 104c according to the present example embodiment is not limited to the configuration.

Next, the decryption unit 104d according to the present example embodiment will be described.

As exemplified in FIG. 1, the decryption unit 104d includes an analysis result determination information 104e and an analysis result storing unit 104f.

When a key data candidate is extracted in the key candidate extraction unit 104a, the decryption unit 104d decrypts (decodes) (encrypted) communication data saved in the communication data storing unit 103f, by use of the key data candidate.

The decryption unit 104d refers to (encrypted) communication data saved in the communication data storing unit 103f and decrypts (decodes) the encrypted communication data by use of a key data candidate saved in the key candidate storing unit 104c. Specifically, the decryption unit 104d decrypts (decodes) communication data transmitted and received in cryptographic communication between the analysis target apparatus 101 and the communication network 105, by use of a key data candidate saved in the key candidate storing unit 104c. The decryption unit 104d may decrypt (decode) communication data by use of a key data candidate and encryption processing data acquired by the key candidate extraction unit 104a, as needed. Communication data being decrypted (decoded) may be hereinafter referred to as "decrypted communication data."

In accordance with data indicating a feature of decrypted communication data, the decryption unit 104d determines whether or not the decrypted communication data are correctly decrypted (decoded). For example, such data indicating a feature of decrypted communication data indicate, an attribute of the decrypted communication data themselves (for example, randomness of the data themselves) or a data format of the decrypted communication data.

Specifically, the decryption unit 104d determines whether or not a result of decryption of communication data with a specific key data candidate is successful, in accordance with the analysis result determination information 104e. Then, when the decryption of the communication data is successful, the decryption unit 104d saves (registers) key data used for the decryption into the analysis result storing unit 104f. Further, the decryption unit 104d may save (register) encryption processing data used for the decryption into the analysis result storing unit 104f along with the key data.

In the following, key data, by which communication data are successfully decrypted in accordance with the analysis result determination information 104e, may be hereinafter referred to as "correct key data."

Figure 9:
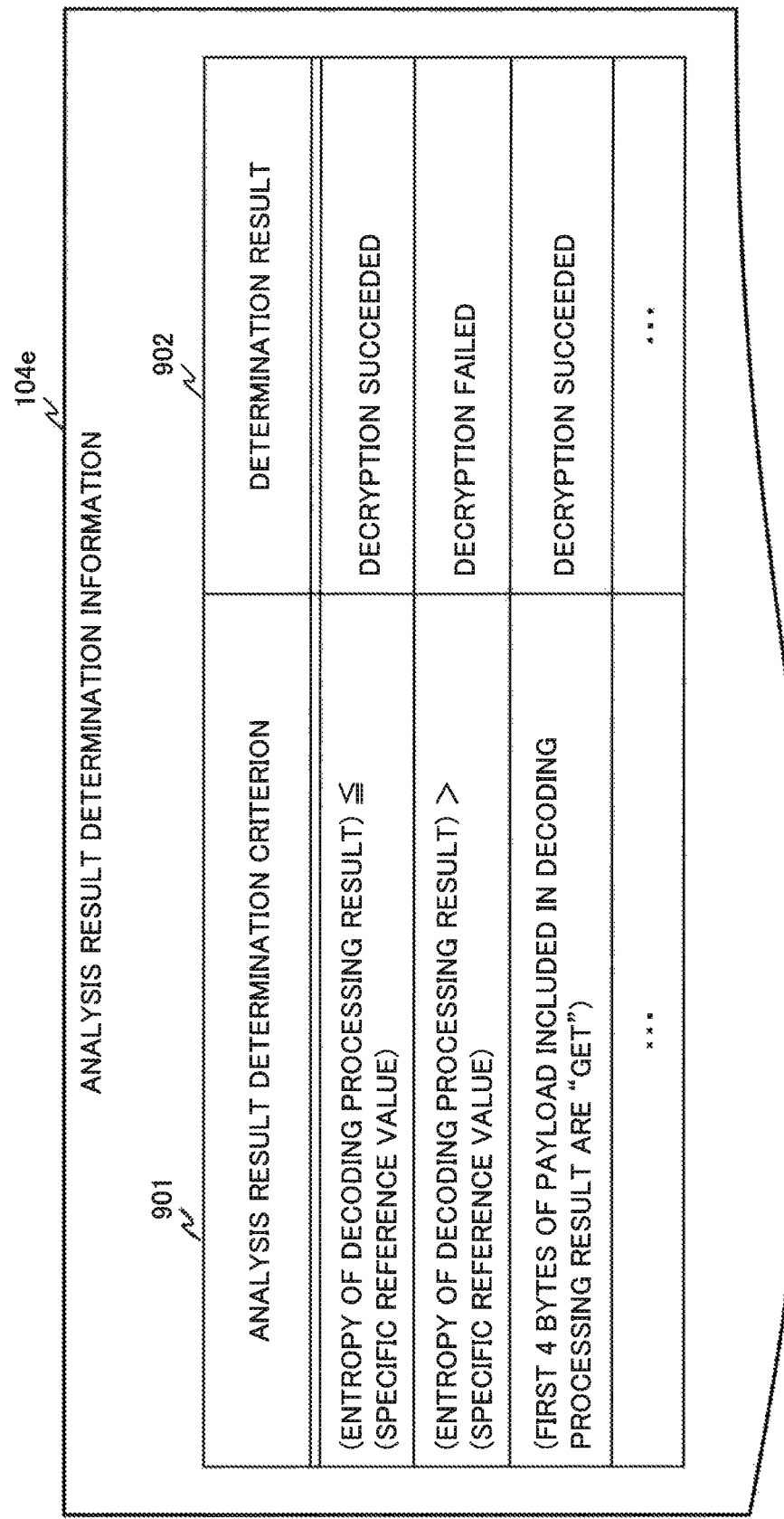
FIG. 9 is a diagram illustrating a specific example of analysis result determination information according to the first example embodiment of the present invention.

As illustrated in FIG. 9, the analysis result determination information 104e includes an analysis result determination criterion 901 and a determination result 902.

In the analysis result determination criterion 901, information indicating a criterion by which whether the decrypted communication data are correctly decrypted (decoded) in accordance with data indicating a feature of decrypted communication data, is set. In this case, for example, information set to the analysis result determination criterion 901 may be expressed in any machine interpretable form (format).

The determination result 902 is set with a determination result when a result of decryption of specific communication data by the decryption unit 104*d* satisfies the analysis result determination criterion 901 (whether or not decryption is successful). In this case, a symbol or the like indicating such a determination result may be registered in the determination result 902.

In accordance with the analysis result determination criterion 901 as described above, the decryption unit 104*d* determines whether or not communication data are successfully decoded. Determination process of whether communication data are successfully decrypted by the decryption unit 104*d* will be described below by use of a specific example illustrated in FIG. 9.

In the specific example illustrated in FIG. 9, for example, the decryption unit 104*d* determines that decrypted communication data are correctly decoded when entropy of the decrypted communication data is less than or equal to a specific reference value.

Further, for example, contrary to the above, the decryption unit 104*d* determines that decryption of communication data is unsuccessful when entropy of the decrypted communication data is greater than a specific reference value.

In general, as described above, as entropy of data becomes larger, a variation of values indicated by data in the data area becomes larger. That is to say, when entropy of decrypted communication data is less than or equal to a specific reference value, a variation of values indicated by data included in the decrypted communication data is relatively small, and therefore it is highly likely that decryption is successful. On the other hand, when entropy of decrypted communication data is greater than a specific reference value, a variation of values indicated by data included in the decrypted communication data is large (for example, randomness is high), and therefore it is highly likely that decryption is unsuccessful. The reason is that, in general, encrypted data (communication data) often have random number values (in which a regularity cannot be found) and values indicated by such data have a large variation.

The specific reference value described above used for determining a magnitude of variation (entropy) of data may be appropriately selected in accordance with knowledge about a common characteristic (randomness) of communication data themselves, a preliminary experiment, or the like.

For example, a standard deviation $\sigma$ can be used as a criterion indicating a degree of variation of such data. Assuming that a variation of data has a normal distribution and a mean value of the data is denoted by "m," approximately 68.2% of the entire data are included in a range of "$m \pm \sigma$" and approximately 95.4% in a range of "$m \pm 2\sigma$." In other words, when the value of $\sigma$ is large, decrypted communication data have an extremely large variation (have high randomness). In this case, the decryption unit 104*d* may appropriately select a value of such $\sigma$ so as to determine decryption to be successful when a variation of the decrypted communication data is relatively small.

Further, for example, as exemplified in FIG. 9, whether or not decrypted communication data include specific data may be employed as a criterion of determining whether decryption of the decrypted communication data is successful. The reason is that, when decrypted communication data include known data or a specific pattern, it is highly likely that the decrypted communication data are correctly decrypted.

Further, other than the above, for example, a criterion indicating whether decrypted communication data conform to a specific data format (expression form representing various types of data) may be employed as a criterion of determining whether decryption of the decrypted communication data is successful. For example, such a data format may include a data format expressing various types of voices, still images, dynamic images, and documents. Further, for example, such a data format may include a file format in a specific file system. The specific example illustrated in FIG. 9 is a typical example, and the present example embodiment is not limited thereto.

The analysis result determination information 104*e* described above may be preset to the decryption unit 104*d* by any technique.

For example, the decryption unit 104*d* executes decryption processing of communication data by use of all key data candidates saved in the key candidate storing unit 104*c* and determines the result in accordance with the analysis result determination information 104*e*. Thus, the decryption unit 104*d* is able to extract correct key data. The decryption unit 104*d* may execute the decryption processing described above on all communication data saved in the communication data storing unit 103*f*.

The decryption unit 104*d* saves (registers) correct key data and decrypted communication data decrypted by the correct key data into the analysis result storing unit 104*f*, based on the result of decrypting communication data in accordance with the analysis result determination information 104*e*. The decryption unit 104*d* may notify the cryptographic communication check unit 103*b* of completion of the decryption processing of the communication data described above.

Figure 10:
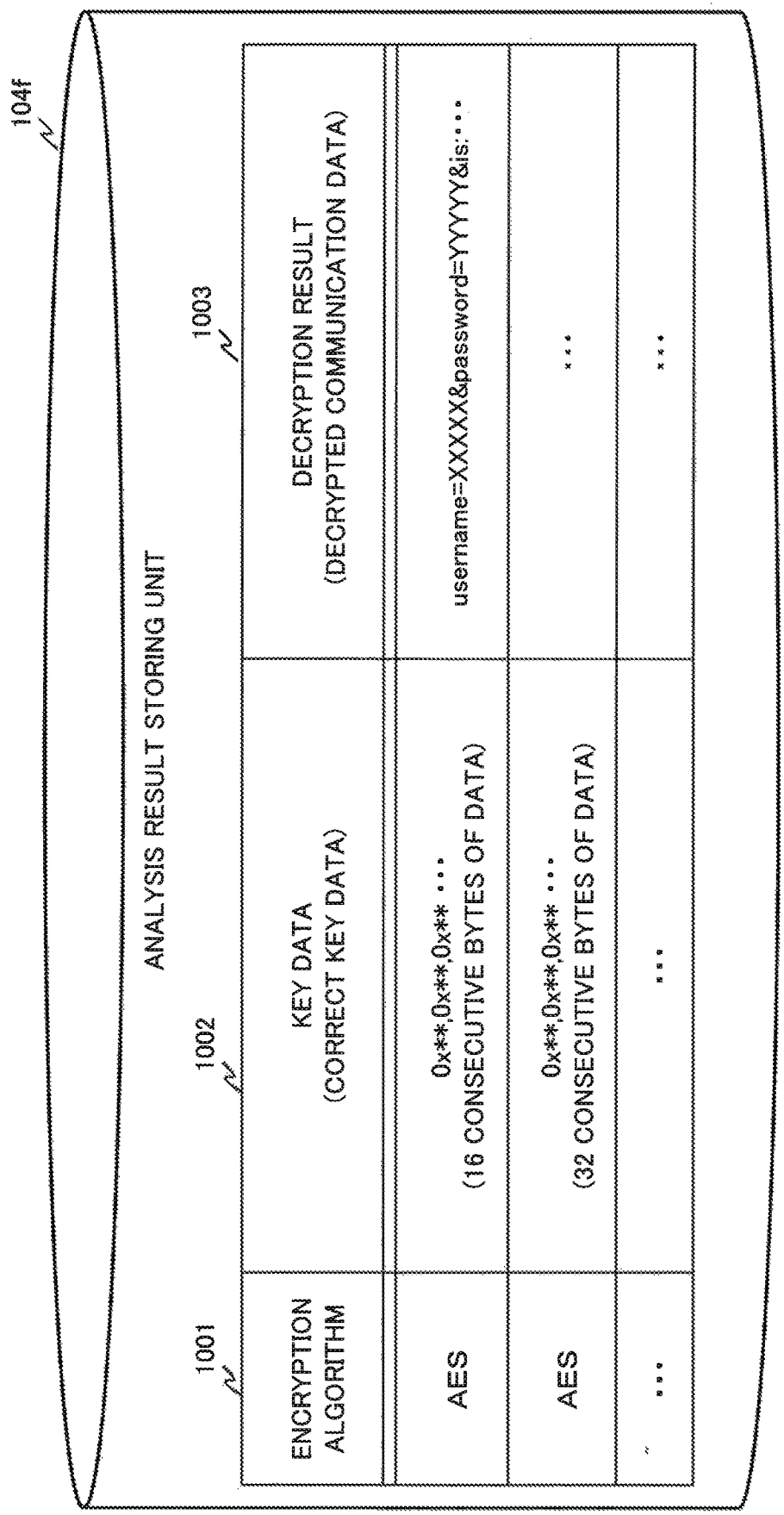
FIG. 10 is a diagram illustrating a specific example of an analysis result storing unit according to the first example embodiment of the present invention.

As exemplified in FIG. 10, the analysis result storing unit 104*f* stores information by which an encryption algorithm can be specified (encryption algorithm 1001 in FIG. 10), correct key data (key data 1002 in FIG. 10), and decrypted communication data (decryption result 1003 in FIG. 10) in association with each other. The configuration exemplified in FIG. 10 is a specific example, and the analysis result storing unit 104*f* according to the present example embodiment is not limited thereto. For example, the analysis result storing unit 104*f* may store only the correct key data or only the decrypted communication data, or may store the data separately. Further, the analysis result storing unit 104*f* may store encryption processing data used in decryption of communication data along with the aforementioned correct key data as part of the key data 1002. The analysis result storing unit 104*f* may store the encryption processing data in an unillustrated area separate from the key data 1002.

(Operation of Analysis System 100)

Next an operation of the analysis system 100 configured as described above will be described. It is assumed as a specific example in the following description that a cryptographic communication protocol between the analysis target apparatus 101 and the communication network 105 is SSL.

Figure 11:
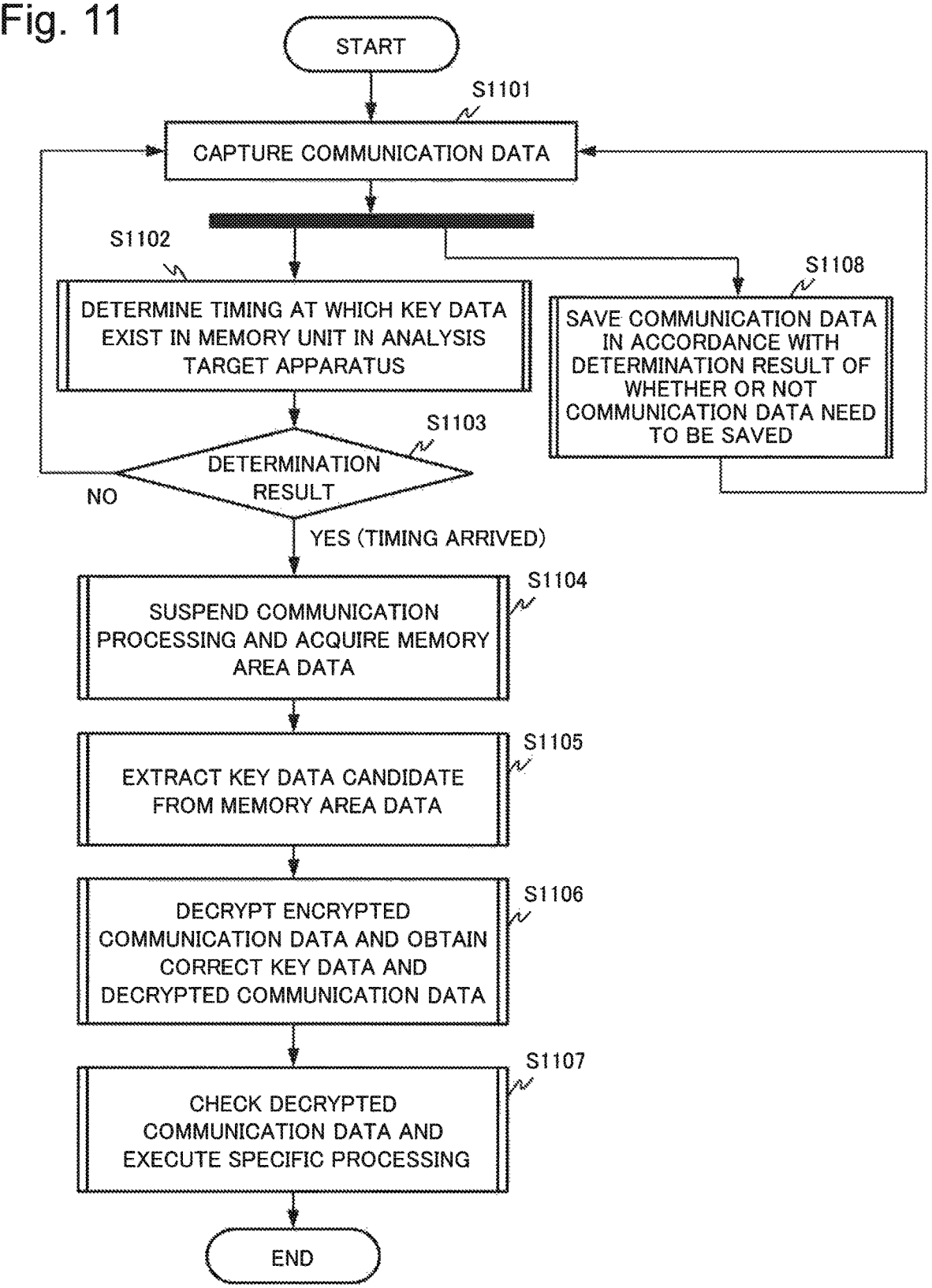
FIG. 11 is a flowchart illustrating an overview of an operation of the analysis system according to the first example embodiment of the present invention.

An overview of the operation of the analysis system 100 will be described with reference to FIG. 11.

First, the communication processing unit 103 captures communication data transmitted and received between the analysis target apparatus 101 and the communication network 105 (Step S1101).

Next, the communication processing unit 103 analyzes the captured communication data and determines a timing at which key data exist in the memory unit 101*b* in the analysis target apparatus 101 (Step S1102).

When the timing is determined to have arrived in Step S1102 (YES in Step S1103), the memory acquisition unit 102 acquires memory area data stored by the memory unit 101b in the analysis target apparatus 101 (Step S1104). When the determination result in Step S1103 is NO, the communication processing unit 103 returns to Step S1101 and continues the processing.

Next, the cryptanalysis unit 104 analyzes the memory area data acquired in Step S1104, in accordance with a specific criterion and extracts a key data candidate (Step S1105).

Next, correct key data and decrypted communication data are obtained in accordance with the result of decryption of the communication data by use of the key data candidate extracted in Step S1105 by the cryptanalysis unit 104 (Step S1106).

Next, the communication processing unit 103 (the cryptographic communication check unit 103b in particular) analyzes a content of the decrypted communication data obtained in aforementioned Step S1106 and executes specific processing (Step S1107). As described above, the communication processing unit 103 (the cryptographic communication check unit 103b in particular) may appropriately select such specific processing.

The communication processing unit 103 capturing communication data in Step S1101 determines whether or not the communication data need to be saved, and saves the communication data in accordance with the determination result (Step S1108). The processing in Step S1108 may be executed in parallel with the processing in Steps S1102 to S1105.

Next, details of the operation of the analysis system 100 described above will be described.

First, operations of the memory acquisition unit 102 and the communication processing unit 103 will be described with reference to flowcharts exemplified in FIGS. 12A and 12B. The flowchart exemplified in FIG. 12A will be described below. FIG. 12B is a flowchart similar to FIG. 12A except for Steps S1209B and S1210B to be described later, and therefore only a point of difference will be described. Processing exemplified in Steps S1201 to S1208 below corresponds to Steps S1101 to S1105 exemplified in FIG. 11.

First, the communication control unit 103a captures communication data transmitted and received between the analysis target apparatus 101 and the communication network 105 (Step S1201).

In this case, as described above, the communication control unit 103a is able to capture both of communication data transmitted from the analysis target apparatus 101 to the communication network 105 and communication data transmitted from the communication network 105 to the analysis target apparatus 101.

Next, the cryptographic communication check unit 103b analyzes the communication data captured in aforementioned Step S1201, and determines whether or not to acquire memory area data stored in the memory unit 101b, in accordance with the key data acquisition policy 103c (Step S1202).

More specifically, the cryptographic communication check unit 103b refers to the key data acquisition policy 103c and determines a timing at which key data exist in the memory unit 101b in the analysis target apparatus 101.

Figure 13:
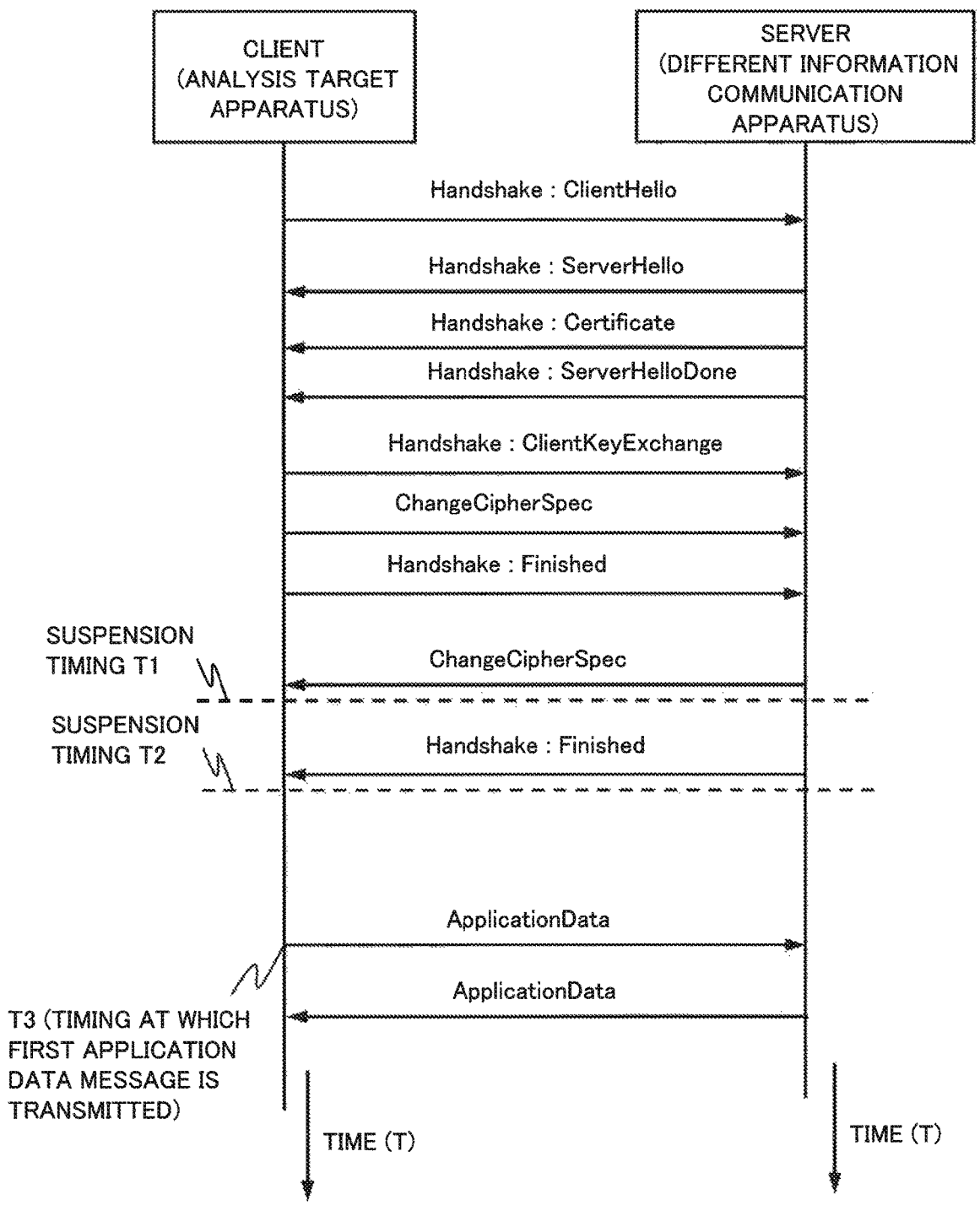
FIG. 13 is a sequence diagram illustrating a sharing procedure of an encryption key in the SSL protocol.

When SSL is employed as a cryptographic communication protocol, for example, in a processing sequence based on the SSL protocol illustrated in FIG. 13, the cryptographic communication check unit 103b may determine arrival of such a timing when the analysis target apparatus 101 receives a ChangeCipherSpec message (a "suspension timing T1" exemplified in FIG. 13) from an SSL server side (from the different information communication apparatus 107 side).

Alternatively, the cryptographic communication check unit 103b may determine arrival of such a timing when the analysis target apparatus 101 receives a Finished message (a "suspension timing T2" exemplified in FIG. 13) from the SSL server side (the different information communication apparatus 107 side).

In aforementioned Step S1202, when the cryptographic communication check unit 103b determines arrival of the timing (YES in Step S1203), the cryptographic communication check unit 103b instructs the communication control unit 103a to suspend communication between the analysis target apparatus 101 and the communication network 105 (Step S1204).

In this case, the communication control unit 103a accepting the instruction suspends the communication between the analysis target apparatus 101 and the communication network 105. A specific method for suspending such communication may be appropriately selected.

In a case of NO in aforementioned Step S1203, the communication control unit 103a returns to Step S1201 and continues the processing.

Next, the cryptographic communication check unit 103b instructs the memory acquisition unit 102 to acquire memory area data stored in the memory unit 101b in the analysis target apparatus 101 (Step S1205).

The memory acquisition unit 102 accepting such an instruction dumps the memory area data stored in the memory unit 101b in the analysis target apparatus 101 (Step S1206). As described above, a specific dump method of data stored in the memory unit 101b may be appropriately selected depending on a configuration of the analysis target apparatus 101.

Next, the memory acquisition unit 102 saves (registers) the acquired memory area data into the memory dump storing unit 102a (Step S1207).

Next, the memory acquisition unit 102 notifies the cryptographic communication check unit 103b of completion of acquisition of the memory area data (Step S1208).

Next, the cryptographic communication check unit 103b receiving the notification in aforementioned Step S1208 instructs the communication control unit 103a to resume the suspended communication. Then, the communication control unit 103a resumes the communication (Step S1209).

When aforementioned Step S1208 is not executed, the cryptographic communication check unit 103b may instruct the communication control unit 103a to resume the suspended communication when a specific time elapses after instructing suspension of the communication in aforementioned Step S1204.

After the processing in aforementioned Step S1209, the cryptographic communication check unit 103b may instruct the cryptanalysis unit 104 to decrypt communication data saved by the communication data recording unit 103d and to extract an encryption key (Step S1210). At this time, when an encryption algorithm and the like used in the cryptographic communication protocol is confirmed from the analysis result of the communication data, the cryptographic communication check unit 103b may provide the cryptanalysis unit 104 with information about the encryption algorithm.

Figure 12A:
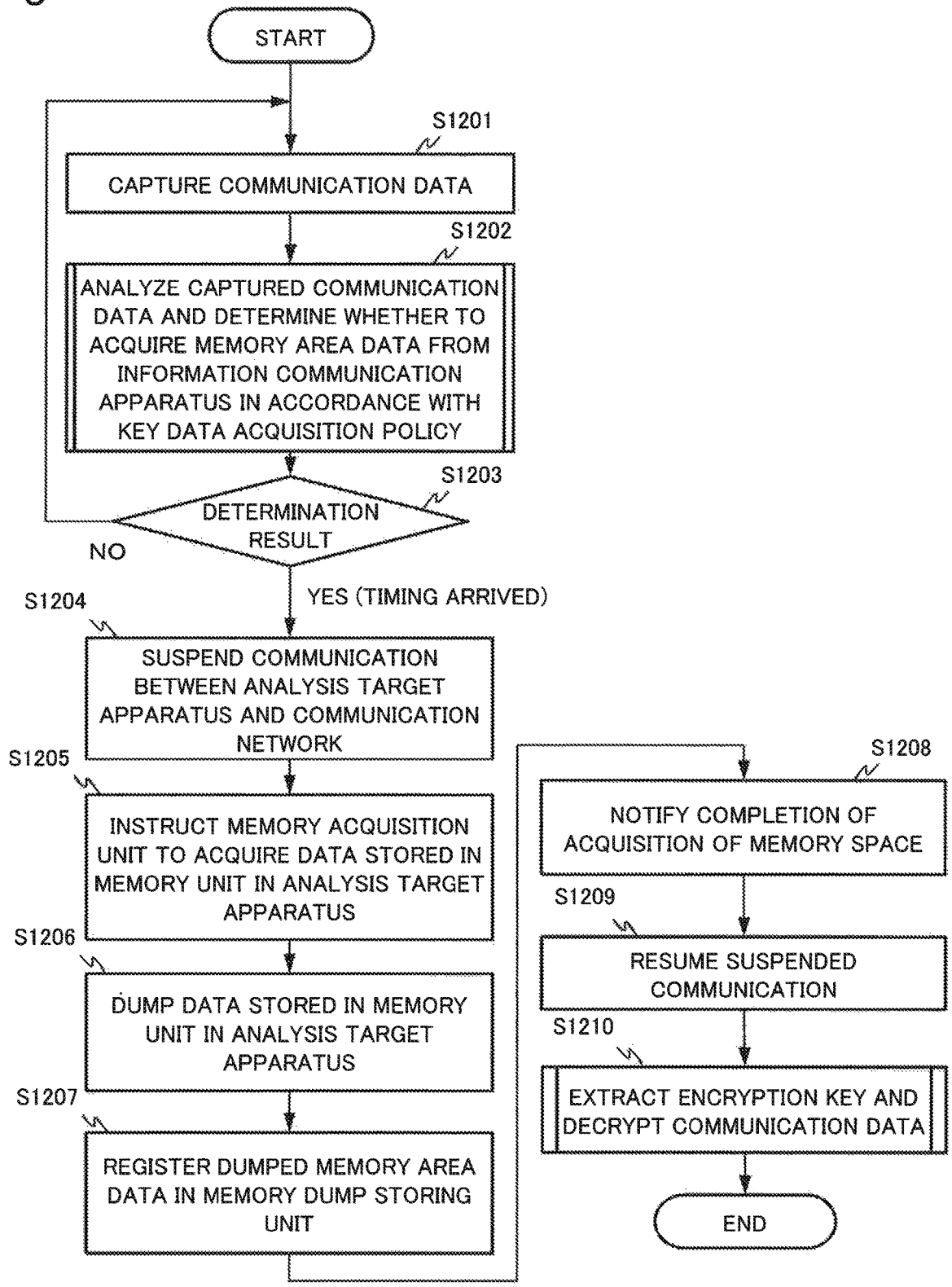
FIG. 12A is a flowchart illustrating an operation of acquiring an encryption key used for cryptographic communication executed between the analysis target apparatus and a communication network, according to the first example embodiment of the present invention.
Figure 12B:
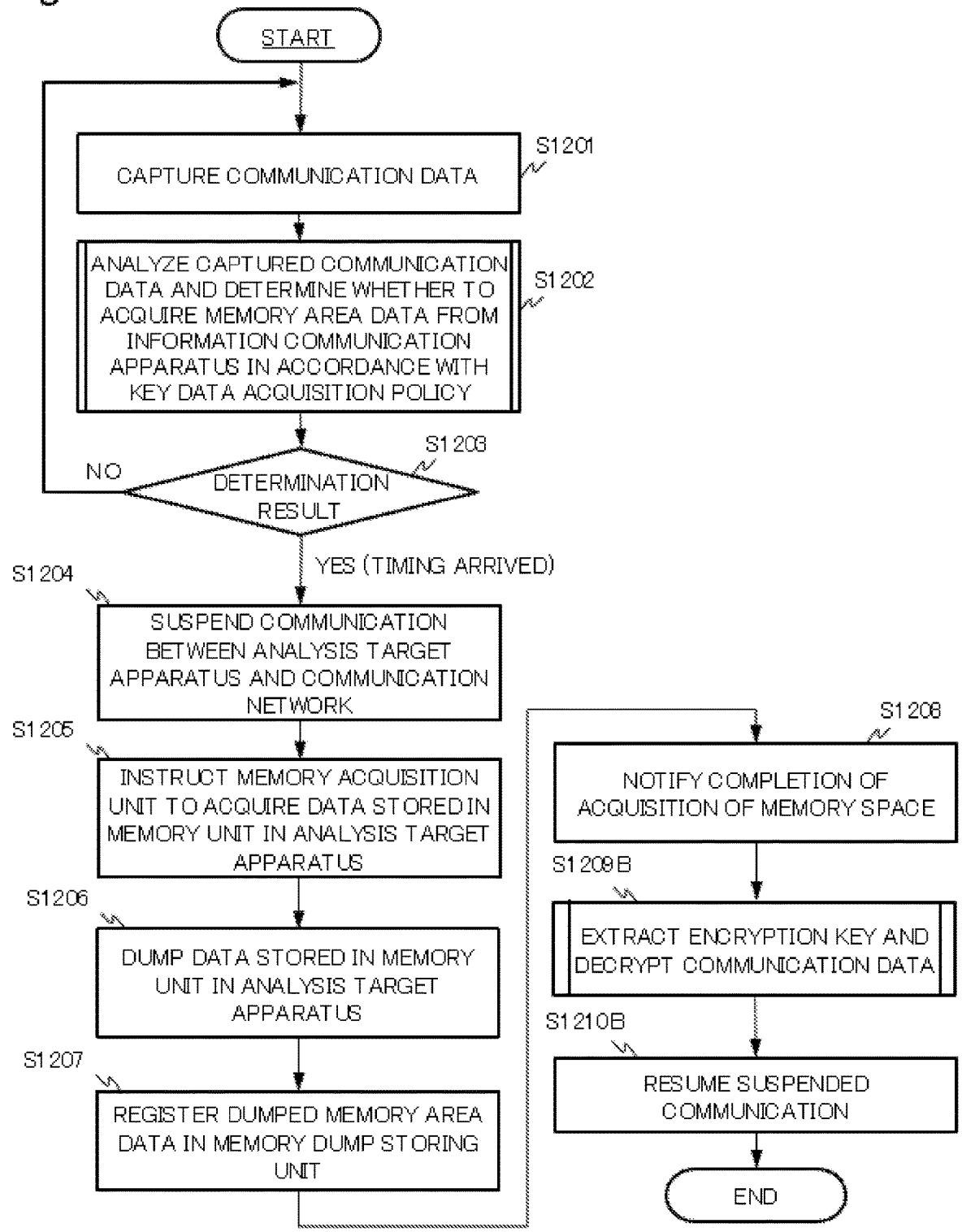
FIG. 12B is a flowchart illustrating an operation of acquiring an encryption key used for cryptographic communication executed between the analysis target apparatus and the communication network, according to the first example embodiment of the present invention.

A processing order of Steps S1209 and S1210 in FIG. 12A described above may be reversed. That is to say, as exemplified in FIG. 12B, the cryptographic communication check unit 103b receiving the notification in aforementioned Step S1208 may instruct the cryptanalysis unit 104 to decrypt communication data saved by the communication data recording unit 103d and to extract an encryption key (Step S1209B). Then, when completion of the decryption processing of the communication data is notified by the cryptanalysis unit 104, the cryptographic communication check unit 103b may instruct the communication control unit 103a to resume the suspended communication (Step S1210B).

Next, processing by the communication processing unit 103 (the communication data recording unit 103d in particular) will be described with reference to a flowchart exemplified in FIG. 14. Steps S1401 to S1404 below correspond to Step S1108 exemplified in aforementioned FIG. 11.

Figure 14:
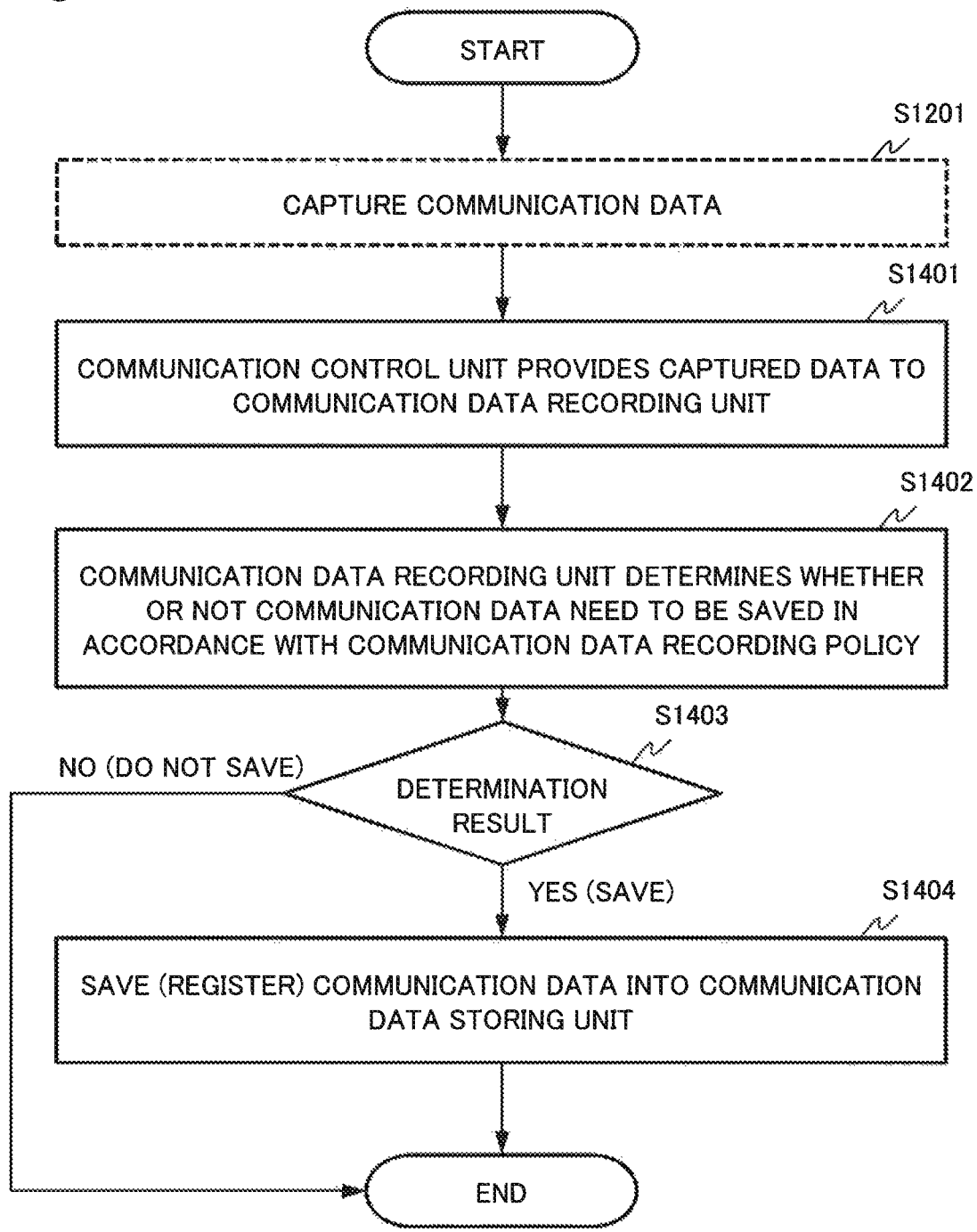
FIG. 14 is a flowchart illustrating an operation of a communication processing unit (a communication data recording unit in particular) according to the first example embodiment of the present invention.

First, in Step S1201 indicated in FIG. 14, the communication control unit 103a captures communication data. Such processing may be similar to Step S1201 exemplified in FIGS. 12A and 12B.

Next, the communication control unit 103a conveys (notifies) the captured communication data to the communication data recording unit 103d (Step S1401).

The communication data recording unit 103d determines whether or not to save the communication data captured in Step S1201, in accordance with the communication data recording policy 103e (Step S1402).

When SSL is employed as a communication protocol, for example, the communication data recording policy 103e (the communication data recording criterion 502 in particular) may be set with a condition representing that communication data at or after "T3", which indicates a timing when the first transmission of ApplicationData message exemplified in FIG. 13, is saved (recorded). Alternatively, for example, the communication data recording policy 103e (the communication data recording criterion 502 in particular) may be set with a condition indicating that communication data at or after the "suspension timing T1" or the "suspension timing T2" respectively exemplified in FIG. 13, is saved (recorded).

When the communication data are saved as a result of determination in Step S1402 (YES in Step S1403), the communication data recording unit 103d registers (saves) the communication data into the communication data storing unit 103f (Step S1404).

In a case of NO in Step S1403, the communication data recording unit 103d does not need to save the communication data.

Through the processing in aforementioned Steps S1401 to S1404, communication data are saved in the communication data storing unit 103f as needed.

Figure 15:
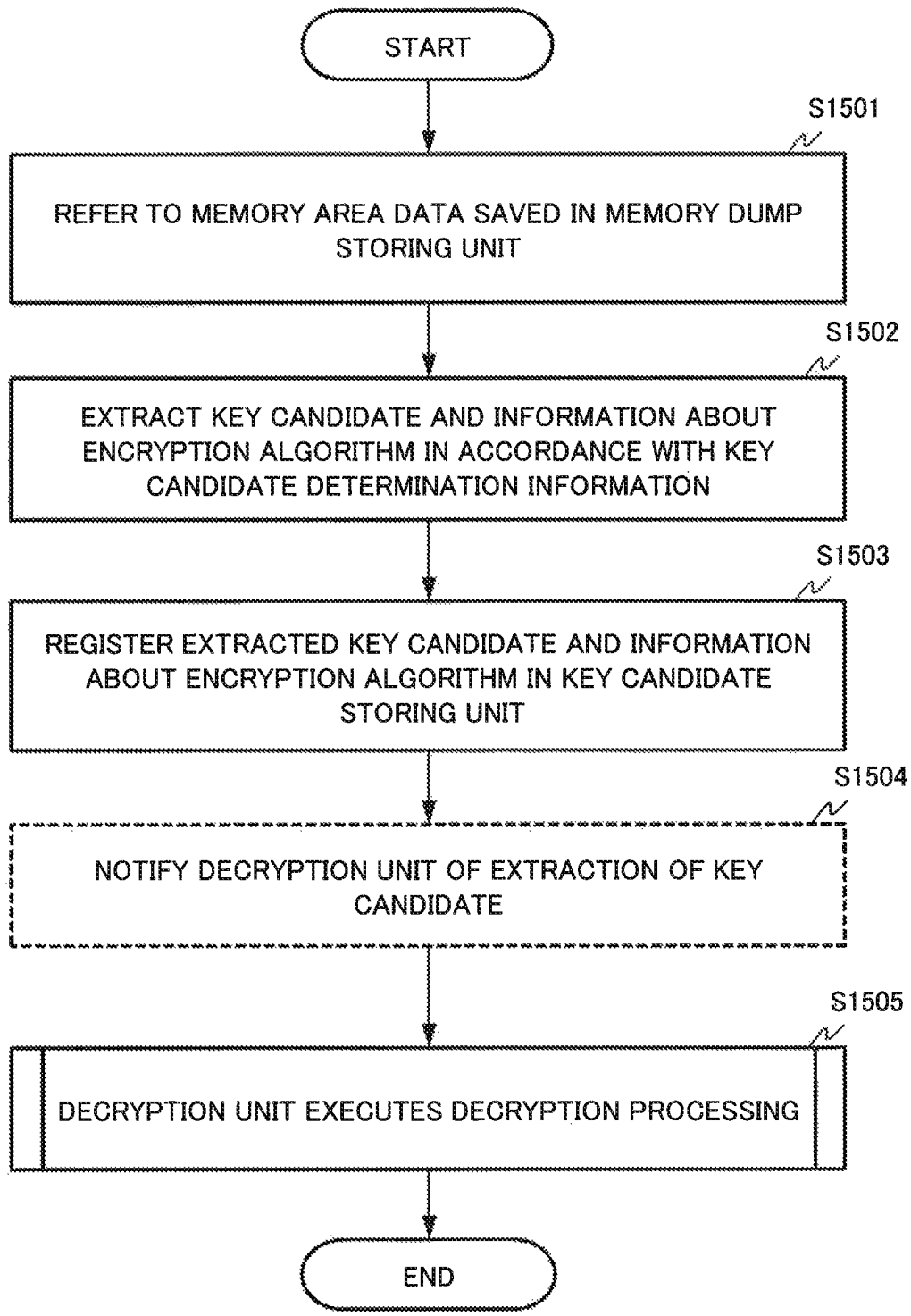
FIG. 15 is a flowchart illustrating an operation of a cryptanalysis unit (a key candidate extraction unit in particular) according to the first example embodiment of the present invention.
Figure 16:
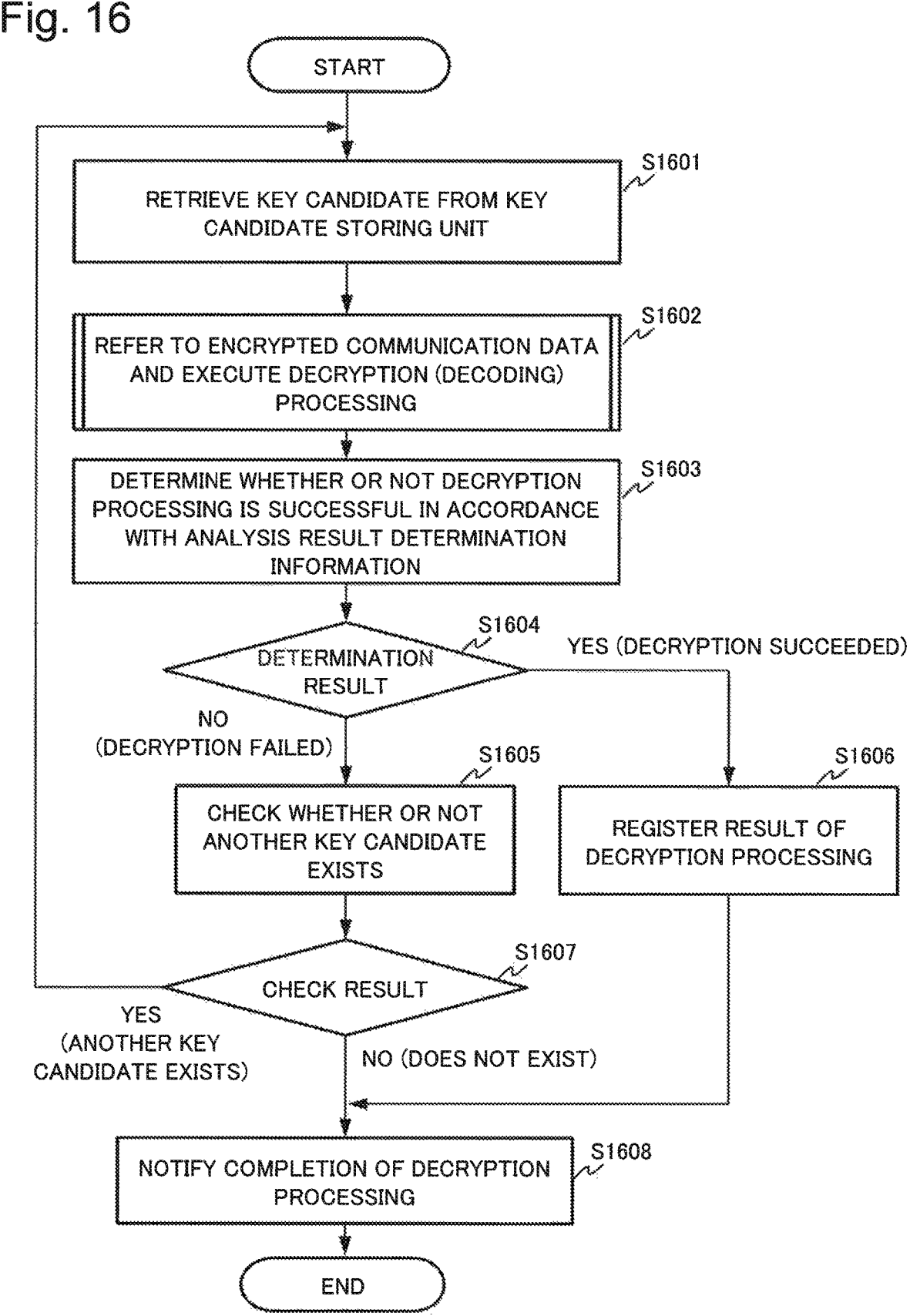
FIG. 16 is a flowchart illustrating an operation of the cryptanalysis unit (a decryption unit in particular) according to the first example embodiment of the present invention.

Next, processing by the cryptanalysis unit 104 will be described with reference to flowcharts exemplified in FIGS. 15 and 16. The flowcharts exemplified in FIGS. 15 and 16 correspond to Steps S1105 and S1106 in FIG. 11.

First an operation of the key candidate extraction unit 104a will be described with reference to the flowchart exemplified in FIG. 15.

As described above, for example, the cryptanalysis unit 104 starts decryption processing with regard to encrypted communication data in response to an instruction from the cryptographic communication check unit 103b (Step S1210).

First, the key candidate extraction unit 104a refers to memory area data registered (saved) in the memory dump storing unit 102a (Step S1501). In this case, the key candidate extraction unit 104a may acquire the memory area data from the memory dump storing unit 102a.

Next, the key candidate extraction unit 104a extracts an encryption key candidate from the memory area data referred (acquired) in Step S1501, in accordance with the key candidate determination information 104b (Step S1502).

As described above, when information about an encryption algorithm is provided by the cryptographic communication check unit 103b, the key candidate extraction unit 104a extracts a key data candidate from the memory area data by use of a key candidate determination criterion 704 associated with the encryption algorithm.

When the encryption algorithm is unknown, the key candidate extraction unit 104a extracts a key data candidate for every encryption algorithm 701 registered in the key candidate determination information 104b in accordance with a key candidate determination criterion 704.

Further, at this time, the key candidate extraction unit 104a may extract information about an encryption algorithm associated with a key data candidate (for example, an encryption algorithm 701 and an encryption parameter 702).

Next, the key candidate extraction unit 104a registers (saves) the key candidate and the information about the encryption algorithm respectively extracted in Step S1502 into the key candidate storing unit 104c (Step S1503).

After Step S1503, the key candidate extraction unit 104a may notify the decryption unit 104d of completion of the extraction processing of the key candidate (Step S1504).

Next, the decryption unit 104d executes processing of decrypting encrypted communication data by use of the key data candidate extracted in aforementioned Steps S1501 to S1503 (Step S1505).

Details of the processing in Step S1505 will be described below with reference to the flowchart exemplified in FIG. 16.

First, the decryption unit 104d acquires a key data candidate registered in the key candidate storing unit 104c (803 in FIG. 8) (Step S1601). At this time, the decryption unit 104d may acquire information about an encryption algorithm associated with the key candidate (801 and 802 in FIG. 8). Further, the decryption unit 104d may acquire encryption processing data associated with the key candidate.

Next, the decryption unit 104d refers to encrypted communication data registered (saved) in the communication data storing unit 103f. In this case, the decryption unit 104d may acquire the communication data from the communication data storing unit 103f.

Then, the decryption unit 104d decrypts (decodes) the acquired communication data, by use of the key data candidate and the information about the encryption algorithm respectively referred (acquired) in aforementioned Step S1601 (Step S1602).

Next, the decryption unit 104d determines whether or not the decrypted communication data being the result of decrypting (decoding) the communication data in Step S1602 are correctly decrypted (decoded), in accordance with the analysis result determination information 104e (Step S1603).

As described above, for example, the decryption unit 104d may determine whether or not the decrypted communication data are correctly decrypted, in accordance with an entropy value of the decrypted communication data, or whether or not the decrypted communication data match a specific data format.

When determining that the decrypted communication data are correctly decrypted (YES in Step S1604), the decryption unit 104d registers the correct key data and the decrypted communication data into the analysis result storing unit 104f (Step S1606).

When determining that the decrypted communication data are not correctly decrypted (NO in Step S1604), the decryption unit 104d checks whether another key data candidate is registered in the key candidate storing unit 104c (Step S1605).

When another key data candidate is registered (YES in Step S1607), the decryption unit 104d continues the processing from Step S1601 and retrieves another key data candidate from the key candidate storing unit 104c.

Through the processing in aforementioned Steps S1601 to S1607, key data including an encryption key by which communication data can be decrypted, and decrypted communication data are obtained.

The decryption unit 104d may notify the cryptographic communication check unit 103b of completion of the decryption processing of the communication data described above (Step S1608).

The cryptographic communication check unit 103b accepting the notification in aforementioned Step S1608 continues the processing from Step S1107 described above. In this case, the cryptographic communication check unit 103b is able to execute specific processing in accordance with the result of analyzing the decrypted communication data.

In the analysis system 100 according to the present example embodiment as configured above, first, the communication processing unit 103 analyzes communication data transmitted and received between the analysis target apparatus 101 and the communication network 105, in accordance with a specific cryptographic communication protocol. Then, in accordance with the result of such analysis, the communication processing unit 103 specifies a timing at which an encryption key encrypting a communication channel between the analysis target apparatus 101 and the communication network 105 exists in the memory unit 101b in the analysis target apparatus 101.

The communication processing unit 103 instructs the memory acquisition unit 102 to acquire memory area data stored in the memory unit 101b at the timing.

Consequently, the memory acquisition unit 102 in the analysis system 100 according to the present example embodiment is able to acquire memory area data including an encryption key encrypting a communication channel between the analysis target apparatus 101 and the communication network 105 from the memory unit 101b in the analysis target apparatus 101.

Further, the communication processing unit 103 (the cryptographic communication check unit 103b in particular) is able to instruct the communication control unit 103a to suspend communication between the analysis target apparatus 101 and the communication network 105 at the aforementioned specific timing. Consequently, the communication processing unit 103 according to the present example embodiment is able to extend a period in which the aforementioned encryption key is stored in the memory unit 101b. The reason is that, by communication between the analysis target apparatus 101 and the communication network 105 being suspended, it is expected that loss, change, or the like of the encryption key according to progress of communication processing does not occur, and thereby it is also expected that the encryption key remain stored in the memory unit 101b. Accordingly, the analysis system 100 according to the present example embodiment is able to acquire memory area data highly likely including the encryption key.

Further, the cryptanalysis unit 104 in the analysis system 100 according to the present example embodiment extracts an encryption key candidate (key data candidate) from the aforementioned acquired memory area data, in accordance with data indicating a feature of key data including the encryption key (key candidate determination information 104b). Then, the cryptanalysis unit 104 determines whether the result of decryption (decoding) of the communication data by use of the extracted key data candidate is successful, in accordance with the analysis result determination information 104e. The cryptanalysis unit 104 is able to acquire key data including a correct encryption key and decrypted communication data, in accordance with such a determination result.

Consequently, the analysis system 100 according to the present example embodiment is able to efficiently extract a key data candidate from memory area data. The reason is that, by the cryptanalysis unit 104 extracting a key data candidate in accordance with data indicating a feature of key data (key candidate determination information 104b) from the memory area data, data not matching the feature of key data are eliminated from the key data candidate. The analysis system 100 according to the present example embodiment is able to determine correct key data included in a plurality of key data candidates. Therefore, it can be said that the analysis system 100 is able to efficiently search the memory area data for the correct key data.

Further, the cryptanalysis unit 104 in the analysis system 100 according to the present example embodiment is able to decrypt encrypted communication data by use of the aforementioned extracted correct key data.

Consequently, the analysis system 100 according to the present example embodiment is able to efficiently extract, from memory area data (second data), in accordance with a specific criterion, an encryption key candidate which enables to decrypt (decode) communication data (first data) encrypted by a specific encryption scheme. Further, the analysis system 100 according to the present example embodiment is able to determine a correct encryption key out of the extracted encryption key candidates, in accordance with a result of decoding the communication data (first data) by use of the extracted encryption key candidates.

In addition, the analysis system 100 according to the present example embodiment provides an effect as follows. That is, the communication processing unit 103 in the analysis system 100 according to the present example embodiment is able to analyze a content of communication data transmitted and received between the analysis target apparatus 101 and the communication network 105, by use of communication data decrypted by the cryptanalysis unit 104. For example, the communication processing unit 103 is able to execute specific processing as described above, depending on the analysis result.

Consequently, the analysis system 100 according to the present example embodiment is able to analyze at least part of encrypted communication data transmitted and received between the analysis target apparatus 101 and the communication network 105. In addition, the analysis system 100 according to the present example embodiment is able to execute specific processing depending on the result of the analysis. Specifically, for example, the analysis system 100 according to the present example embodiment is able to analyze a content of cryptographic communication by any software program such as malware executed on the analysis target apparatus 101. In particular, the analysis system 100 according to the present example embodiment is able to analyze a content of cryptographic communication by a technology non-invasive to the software program and the analysis target apparatus 101, and is able to execute any processing in accordance with the analysis result.

<Modified Example of First Example Embodiment>

A modified example of the first example embodiment described above will be described below.

The key candidate extraction unit 104a according to the first example embodiment extracts a key data candidate from memory area data acquired in the memory acquisition unit 102, in accordance with the key candidate determination information 104b.

A key candidate extraction unit 104a according to the present modified example embodiment extends functionality of the key candidate extraction unit 104a according to the first example embodiment so as to extract from memory area data at least either one of the candidate of encryption processing data described above, and a candidate of key-material data. The key-material data are used as base material data to generate the aforementioned encryption key. For example, such a candidate of key-material data may include "pre_master_secret" and "master_secret" in SSL.

Similarly to the key data described above, such encryption processing data and key-material data may respectively exhibit a characteristic feature in data included in the memory area data. For example, a feature of the data indicates an attribute of such data (for example, randomness of the data themselves), an arrangement pattern (an arrangement position and sequence of arranged data) of such data in the memory area data, or the like.

Further, similarly to the aforementioned feature of key data, features of encryption processing data and key-material data may vary by various types of conditions related to execution of cryptographic communication. Specifically, for example, a feature of such data may vary by an encryption algorithm used in the aforementioned cryptographic communication protocol, an execution environment of processing related to the encryption scheme in the analysis target apparatus 101, or the like.

For example, a type of data required as encryption processing data in a case that GCM is employed as a cipher mode of operation in a specific encryption algorithm varies from the data required in a case that CBC mode is employed, and a characteristic of the data themselves also varies. For example, some data have high randomness, and some data are set to predetermined values. In addition, an arrangement position of encryption processing data in memory area data may vary depending on an execution environment of encryption processing in the analysis target apparatus 101.

Similarly to the aforementioned feature of key data, by collecting and extracting pattern from data indicating a feature of the data in advance, it is possible to provide a determination criterion which can be used to extract candidates of the data from memory area data. The key candidate extraction unit 104a according to the present modified example embodiment extracts the data candidates from the memory area data in accordance with the determination criterion. For example, the determination criterion may be set with locations (places) where the candidates of the data are searched (extracted). Alternatively, for example, the determination criterion may be set with a determination method for determining whether or not specific data corresponds to the data, and the like.

Such a determination criterion may be added to the key candidate determination information 104b according to the first example embodiment. Further, such a determination criterion may be added to the key candidate extraction unit 104a as a new component (unillustrated) constituting the key candidate extraction unit 104a.

When extracting a candidate of the aforementioned key-material data, the decryption unit 104d according to the present modified example embodiment may generate the aforementioned key data candidate from the candidate of the key-material data. In general, a method of generating an encryption key from key-material data is defined for each cryptographic communication protocol (or an encryption algorithm used in the cryptographic communication protocol). For example, in a case of the SSL protocol, a method of generating "master_secret" from "pre_master_secret" and a method of generating a key used in cryptographic communication, and the like from "master_secret" are defined as specifications of the SSL protocol.

Similarly to the first example embodiment, the decryption unit 104d according to the present modified example embodiment decrypts communication data by use of a key data candidate and a candidate of encryption processing data. Similarly to the first example embodiment, the decryption unit 104d according to the present modified example embodiment determines whether the decryption result is successful, in accordance with the analysis result determination information 104e.

When decryption of communication data is successful, the decryption unit 104d according to the present modified example embodiment may save (register) the correct key data, the decrypted communication data, and the encryption processing data into the analysis result storing unit 104f.

The analysis system 100 according to the present modified example embodiment as configured above is able to extract at least either one of a candidate of encryption processing data and a candidate of key-material data, in accordance with a predetermined determination criterion. Further, similarly to the first example embodiment, in accordance with a result of decrypting the communication data by use of the data, the analysis system 100 according to the present modified example embodiment is able to acquire correct key data and decrypted communication data.

Further, the analysis system 100 according to the present example embodiment has a configuration similar to that of the analysis system 100 according to the first example embodiment, and therefore provides effects similar to the first example embodiment.

<Second Example Embodiment>

Figure 17A:
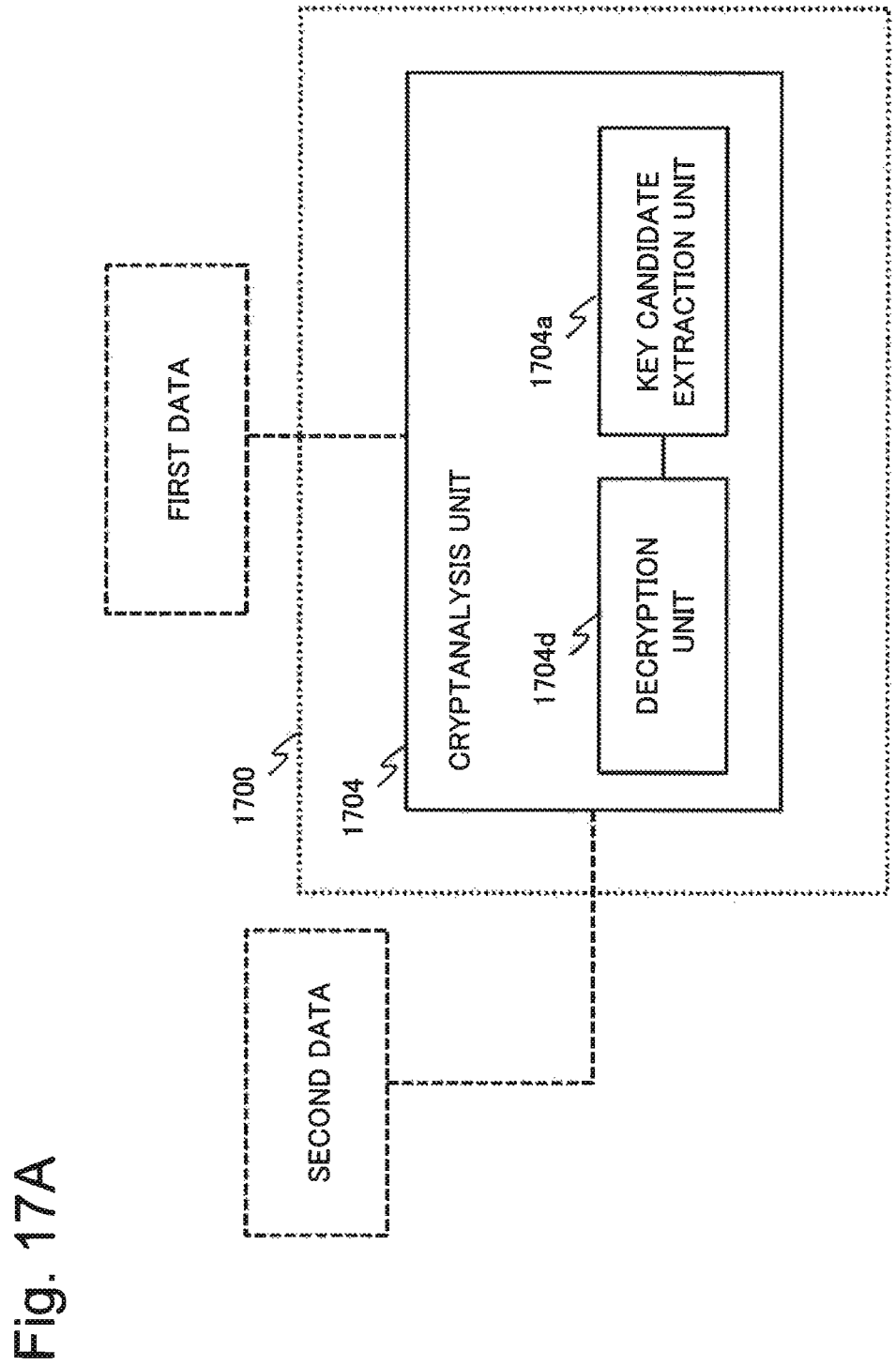
FIG. 17A is a block diagram illustrating functional configurations of an analysis system, an analysis target apparatus, and the like, according to a second example embodiment of the present invention.

Next, a second example embodiment of the present invention will be described with reference to FIG. 17A. FIG. 17A is a block diagram exemplifying a functional configuration of an analysis system 1700 according to the present example embodiment.

The analysis system 1700 according to the present example embodiment at least includes a cryptanalysis unit 1704.

The cryptanalysis unit 1704 may be implemented by use of an information processing apparatus such as a physical computer, or may be implemented by use of a VM provided in a virtualization infrastructure.

The cryptanalysis unit 1704 includes a key candidate extraction unit 1704a extracting, from second data, one or more candidates of key data including an encryption key enables to decrypt first data encrypted by a specific encryption scheme, in accordance with a feature of the key data. Further, the cryptanalysis unit 1704 includes a decryption unit 1704d extracting, in accordance with a result of decrypting the first data by use of one or more of the candidates of key data extracted by the key candidate extraction unit 1704a, correct key data which enables to correctly decrypt the encrypted first data, from the one or more of the candidates of key data.

That is, the cryptanalysis unit 1704 is able to extract, from second data, key data including an encryption key by which encrypted first data can be decrypted. For example, such a cryptanalysis unit 1704 may be configured similar to the cryptanalysis unit 104 according to the respective aforementioned example embodiments.

Consequently, the analysis system 1700 according to the present example embodiment is able to efficiently extract, from second data, in accordance with a specific criterion, a candidate of an encryption key by which first data encrypted by a specific encryption scheme can be decrypted (decoded). The reason is that, in accordance with a feature of key data including the encryption key, the key candidate extraction unit 1704a can extract the key data from second data.

Further, the present example embodiment is able to determine a correct encryption key out of the extracted encryption key candidates in accordance with the result of decrypting (decoding) the first data by use of the extracted encryption key candidates.

<Modified Example of Second Example Embodiment>

A modified example of the second example embodiment described above will be described below.

Figure 17B:
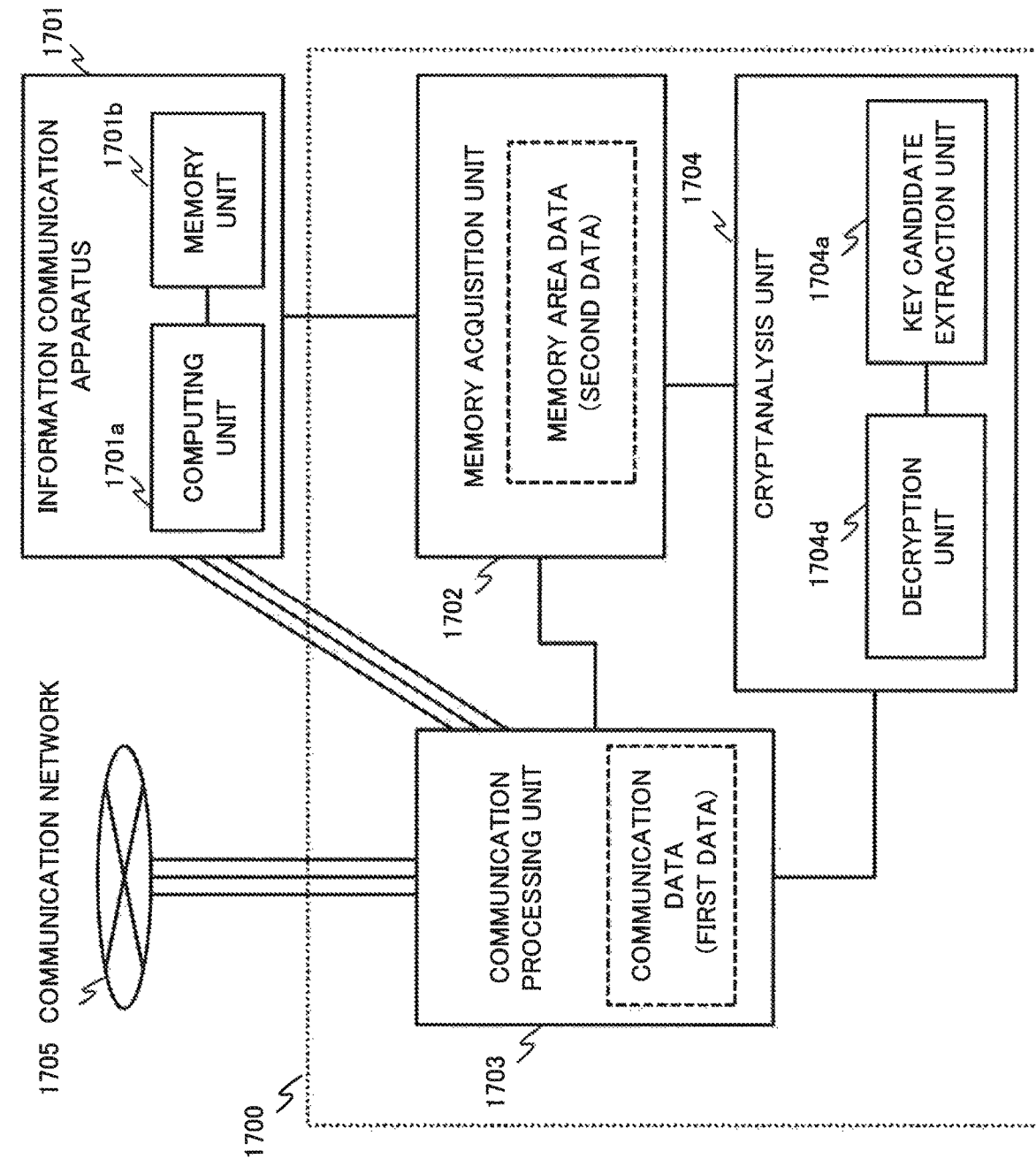
FIG. 17B is a block diagram illustrating functional configurations of an analysis system, an analysis target apparatus, and the like, according to a modified example of the second example embodiment of the present invention.

As illustrated in FIG. 17B, an analysis system 1700 according to the present modified example includes a memory acquisition unit 1702 and a communication processing unit 1703 in addition to the analysis system 1700 according to the second example embodiment. Each component of the analysis system 1700 according to the present modified example may be implemented by use of an information processing apparatus such as a physical computer, or may be implemented by use of a VM provided in a virtualization infrastructure. Further, the respective components of the analysis system 1700 according to the present modified example are communicably connected with one another by use of any communication method.

The analysis system 1700 according to the present modified example is able to analyze communication data transmitted and received in accordance with a specific cryptographic communication protocol between an information communication apparatus 1701 and a communication network 1705.

The information communication apparatus 1701 and the communication network 1705 that are exemplified in FIG. 17B may be respectively configured similar to the analysis target apparatus 101 and the communication network 105 according to the first example embodiment, and therefore detailed description thereof will be omitted.

Each component of the analysis system 1700 according to the present modified example will be described below.

First, a cryptanalysis unit 1704 according to the present modified example is communicably connected to the memory acquisition unit 1702 and the communication processing unit 1703, and is able to refer to various data (to be described later) stored by the units. The remaining configuration of the cryptanalysis unit 1704 according to the present modified example is similar to the cryptanalysis unit 1704 according to the second example embodiment.

The memory acquisition unit 1702 acquires at least part of data stored in a memory unit 1701b from the information communication apparatus 1701 including a computing unit 1701a and the memory unit 1701b. Such a memory acquisition unit 1702 may be configured similar to the memory acquisition unit 102 according to the first example embodiment.

The communication processing unit 1703 determines whether key data including an encryption key used in encryption processing in a specific cryptographic communication protocol are stored in the memory unit 1701b, in accordance with communication data transmitted and received in accordance with the cryptographic communication protocol between the information communication apparatus 1701 and the communication network 1705. Then, in accordance with the determination result, the communication processing unit 1703 instructs the memory acquisition unit 1702 to acquire data stored in the memory unit 1701b. Such a communication processing unit 1703 may be configured similar to the communication processing unit 103 according to the first example embodiment.

The first data according to the present modified example may be the aforementioned encrypted communication data transmitted and received in accordance with a specific cryptographic communication protocol between the information communication apparatus 1701 and the communication network 1705. Such first data may be stored by the communication processing unit 1703.

The second data according to the present modified example may be data stored in the memory unit 1701b, the data being acquired by the memory acquisition unit 1702. Such second data may be stored by the memory acquisition unit 1702.

Consequently, the analysis system 1700 according to the present modified example is able to acquire, from the memory unit 1701b in the information communication apparatus 1701, data including an encryption key used in cryptographic communication executed between the information communication apparatus 1701 and the communication network 1705.

More specifically, by analyzing data transmitted and received by the cryptographic communication, the analysis system 1700 according to the present modified example determines whether an encryption key used in the cryptographic communication exists in the memory unit 1701b in the information communication apparatus 1701. Then, in accordance with the determination result, the analysis system 1700 is able to acquire data including the encryption key, being stored in the memory unit 1701b.

Then, the analysis system 1700 according to the present modified example is able to efficiently extract, from second data, in accordance with a specific criterion, a candidate of the encryption key which enables to decrypt (decode) encrypted communication data (first data) transmitted and received by the cryptographic communication. The reason is that, in accordance with a feature of key data including an encryption key, the key candidate extraction unit 1704a can extract the key data from data (second data) stored in the memory unit 1701b.

Further, similarly to the second example embodiment, in accordance with a result of decrypting (decoding) encrypted communication data (first data) by use of the extracted encryption key candidates, the analysis system 1700 according to the present modified example is able to determine a correct encryption key out of the extracted encryption key candidates.

<Configuration of Hardware and Software Program (Computer Program)>

A hardware configuration capable of providing the respective example embodiments described above will be described below.

In the description below, the analysis systems (reference signs 100 and 1700) described in the respective aforementioned example embodiments may be collectively and simply referred to as "the analysis system." Further, each component in the analysis system (for example, the memory acquisition unit (102 and 1702), the communication processing unit (103 and 1703), and the cryptanalysis unit (104 and 1704) may be collectively and simply referred to as "a component of the analysis system."

As described above, the analysis system described in the respective aforementioned example embodiments may be realized by a single apparatus (for example, a physical information processing apparatus or a virtual information processing apparatus). Further, the analysis system described in the respective aforementioned example embodiments may be realized by combining a plurality of physically or logically separated apparatuses (a physical information processing apparatus and a virtual information processing apparatus) and the like.

More specifically, the analysis system described in the respective aforementioned example embodiments may be configured by use of a dedicated hardware apparatus. In that case, each component illustrated in the respective aforementioned drawings may be realized as hardware (for example, an integrated circuit implementing processing logic) integrating the component in part or in whole.

For example, when each component is realized by hardware, each component may be realized by use of an integrated circuit implemented by a system-on-a-chip (SoC) or the like, capable of providing a function of each component. In this case, for example, data stored by each component may be stored in a RAM area and a flash memory area, being integrated as a SoC.

Further, in this case, as a communication line connecting each component, a known communication bus may be employed. Further, the communication line connecting each component is not limited to bus connection, and each component may be connected with one another on a peer-to-peer basis.

Figure 18:
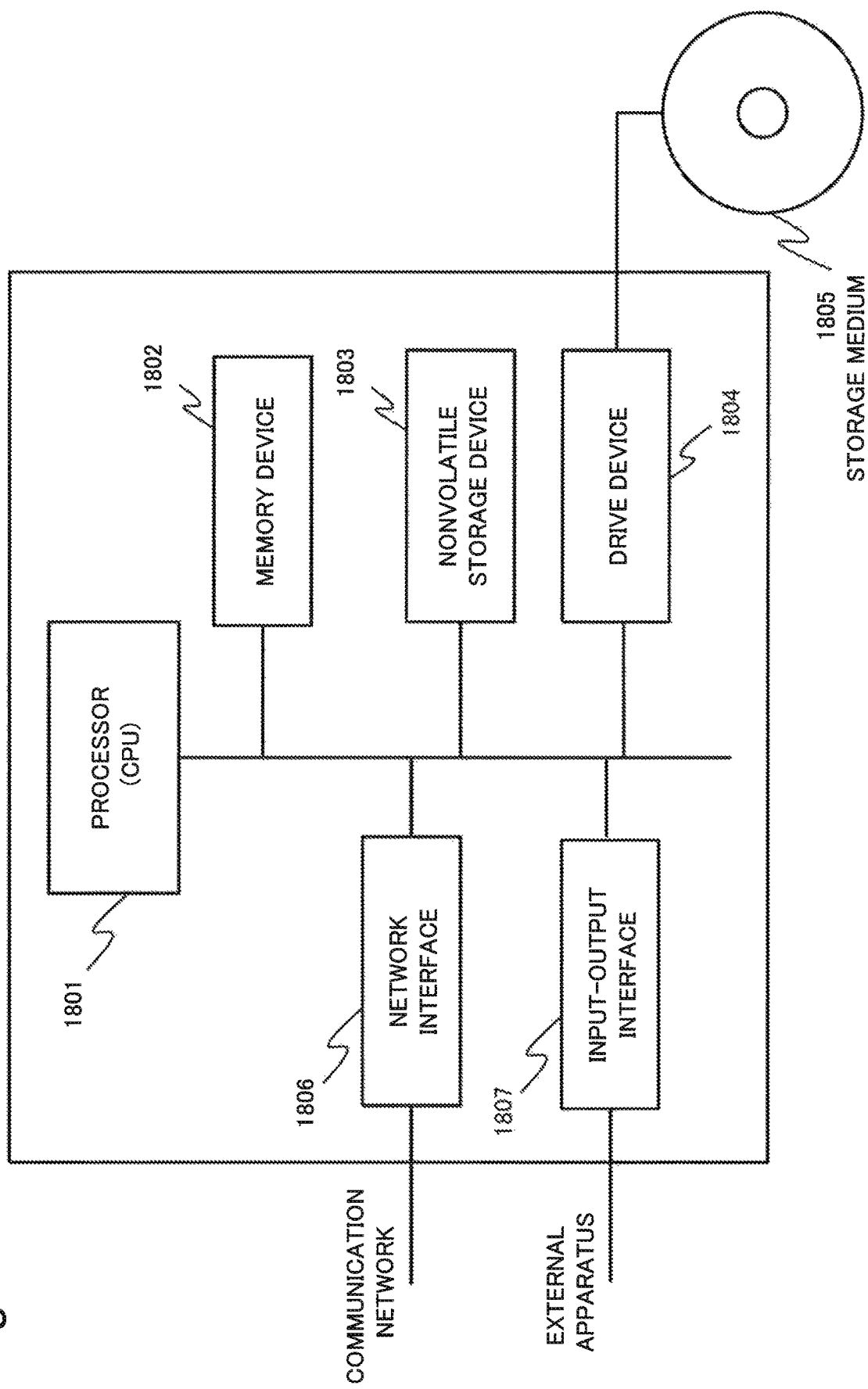
FIG. 18 is a block diagram illustrating a hardware configuration of an information processing apparatus capable of providing the analysis system according to the respective example embodiments of the present invention or a component of the analysis system.

Further, the aforementioned analysis system or a component of the analysis system may be configured by hardware as exemplified in FIG. 18 and various types of software programs (computer programs) executed by such hardware.

A processor 1801 in FIG. 18 is a computing device such as a general-purpose central processing unit (CPU) and a microprocessor. For example, the processor 1801 may read various types of software programs stored in a nonvolatile storage device 1803 to be described later into a memory device 1802 and execute processing in accordance with such software programs.

The memory device 1802 is a memory device such as a random access memory (RAM) that can be referred to by the processor 1801 and stores a software program, various types of data, and the like. The memory device 1802 may be a volatile memory apparatus.

The nonvolatile storage device 1803 is a nonvolatile storage device such as a magnetic disk drive and a semiconductor storage apparatus composed of a flash memory. The nonvolatile storage device 1803 is able to store various types of software programs, data, and the like.

A network interface 1806 is an interface connected to a communication network and, for example, may employ an interface apparatus for wired and wireless local area network (LAN) connection.

For example, the analysis system according to the respective aforementioned example embodiments or a component of the analysis system is communicably connected to the analysis target apparatus 101, the information communication apparatus 1701, and the communication network (105, 1705) by use of the network interface 1806.

The analysis system according to the respective aforementioned example embodiments or a component of the analysis system (the communication processing unit (103, 1703) in particular) may include a plurality of network interfaces 1806. In this case, for example, a particular network interface 1806 may be connected to the analysis target apparatus 101 or the information communication apparatus 1701, and another network interface 1806 may be connected to the communication network (105, 1705).

For example, a drive device 1804 is an apparatus processing read and write of data from and to a storage medium 1805 to be described later.

The storage medium 1805 is any recording medium capable of recording data, such as an optical disk, a magneto-optical disk, and a semiconductor flash memory.

An input-output interface 1807 is a device controlling input and output from and to an external apparatus. For example, a user or an administrator of the analysis system may input an instruction for various types of operation, and the like to the analysis system by use of various types of input and output apparatuses (for example, a keyboard, a mouse, a display apparatus, and a printer) connected through the input-output interface.

For example, according to the present invention described with the respective example embodiments as examples, the analysis system or a component thereof may be configured by the hardware apparatus exemplified in FIG. 18. Then, according to the present invention, a software program capable of providing the functions described in the respective aforementioned example embodiments may be supplied to such a hardware apparatus. In this case, the present invention may be provided by the processor 1801 executing the software program supplied to such an apparatus.

Each unit illustrated in the respective drawings (for example, FIGS. 1, 17A, and 17B) according to the respective aforementioned example embodiments can be provided as a software module that is a functional (processing) unit of a software program executed by the aforementioned hardware. Note that arrangement of each software module illustrated in the drawings is a configuration for convenience of description, and various configurations can be assumed in a view of implementation.

For example, when the respective units exemplified in FIGS. 1, 17A, and 17B are provided as software modules, a configuration may be considered in which the software modules are stored in the nonvolatile storage device 1803, and, when executing each set of processing, the processor 1801 reads the software modules into the memory device 1802.

Further, a configuration may be considered in which various types of data can be mutually transferred between the respective software modules by an appropriate method such as shared memory and inter-process communication. The respective software modules can be communicably connected with one another with such a configuration.

Additionally, the respective aforementioned software programs may be recorded in the storage medium 1805. In this case, the software program is configured to be stored in the nonvolatile storage device 1803 through the drive device 1804 in a shipping stage, an operation stage, or the like of the aforementioned communication apparatus and the like.

Further, when a component of the aforementioned analysis system is provided as a software program, various types of data related to each of the following components described in the respective aforementioned example embodiments may be stored in the memory device 1802 and the nonvolatile storage device 1803 by use of an appropriate file system, a database, and the like. Such components include the memory dump storing unit 102a, the key data acquisition policy 103c, the communication data recording policy 103e, the communication data storing unit 103f, the key candidate determination information 104b, the key candidate storing unit 104c, the analysis result determination information 104e, and the analysis result storing unit 104f.

In the case described above, as for a supply method of various types of software programs to the analysis system, a method of installation into the apparatus by utilizing an appropriate tool, in a manufacture stage before shipment, a maintenance stage after shipment, or the like, may be employed. Further, as for the supply method of various types of software programs, a currently common procedure such as a method of downloading from outside through a communication line such as the Internet may be employed.

In such a case, it may be considered that the present invention is configured with a code constituting such a software program or a computer readable storage medium recording such a code.

Further, the aforementioned analysis system or a component of the analysis system may be configured with a virtualization environment virtualizing the hardware apparatus exemplified in FIG. 18 and various types of software programs (computer programs) executed on the virtualization environment. In this case, a component of the hardware apparatus exemplified in FIG. 18 is provided as a virtual device in the virtualization environment. In this case, the present invention can be provided with a configuration similar to the case that the hardware apparatus exemplified in FIG. 18 is configured as a physical apparatus.

The present invention has been described above as examples applied to the aforementioned exemplary embodiments. However, the technical scope of the present invention is not limited to the respective aforementioned example embodiments. It is obvious to a person skilled in the art that various changes or modifications can be made to such example embodiments. In other words, various embodiments that can be understood by a person skilled in the art may be applied to the present invention, within the scope thereof. In such a case, a new example embodiment with such a change or modification can be included in the technical scope of the present invention. Further, a combination of such example embodiments can be included in the technical scope of the present invention. This is obvious from matters described in CLAIMS.

For example, the present invention is applicable to analysis of communication processing in development and operation stages of an information communication apparatus, and analysis of communication processing of various types of programs executed on an information communication apparatus. More specifically, for example, the present invention is applicable to a check system checking improper communication processing executed by various types of programs in an information communication apparatus and executing appropriate processing depending on a content the communication processing.

This application claims priority based on Japanese Patent Application No. 2014-195177 filed on Sep. 25, 2014, the disclosure of which is hereby incorporated by reference thereto in its entirety.

REFERENCE SIGNS LIST

100 Analysis system
101 Analysis target apparatus
102 Memory acquisition unit
103 Communication processing unit
104 Cryptanalysis unit
105 Communication network
106 Communication channel
107 Different information communication apparatus
1700 Analysis system
1701 Information communication apparatus
1702 Memory acquisition unit
1703 Communication processing unit
1704 Cryptanalysis unit
1705 Communication network
1801 Processor
1802 Memory device
1803 Nonvolatile storage device
1804 Drive device
1805 Storage medium
1806 Network interface
1807 Input-output interface

What is claimed is:

1. An analysis system comprising a processing circuitry configured to function as a cryptanalysis unit,
the cryptanalysis unit including:
at least one hardware processor configured to implement:
a key candidate extraction unit that is configured to extract, from second data, one or more candidates of key data that include an encryption key that enables to decrypt first data encrypted by a specific encryption scheme, based on data indicating a feature of the key data; and
a decryption unit that is configured to extract, from the extracted candidates of key data, correct key data that enables to correctly decrypt the encrypted first data, based on a result of decrypting the first data by use of the extracted candidates of key data,
wherein the key candidate extraction unit extracts, from the second data, the one or more of the candidates of key data, based on key candidate determination information including the encryption scheme, and a key candidate determination criterion including information that enables to extract the candidate of key data from the second data based on the data indicating the feature of the key data used in the encryption scheme, and
wherein the key candidate determination information includes an encryption parameter related to an encryption algorithm and an execution environment of encryption processing related to the encryption algorithm.

2. The analysis system according to claim 1, wherein
the data indicating the feature of the key data represent entropy of specific data included in the second data, and
the key candidate determination criterion includes information that enables to determine whether to extract the specific data as the candidate of key data based on the entropy.

3. The analysis system according to claim 1, wherein
the data indicating the feature of the key data represent a value of specific data included in the second data, and
the key candidate determination criterion includes information that enables to determine whether to extract the specific data as the candidate of key data based on whether the specific data include a predetermined value.

4. The analysis system according to claim 1, wherein
the data indicating the feature of the key data represent data indicating a placement pattern of specific data included in the second data, and the key candidate determination criterion includes information that enables to determine whether to extract the specific data as the candidate of key data based on the data indicating the placement pattern.

5. The analysis system according to claim 1, wherein the key candidate determination information further includes at least one of an encryption parameter at least including a size of the key and an encryption mode used in the encryption scheme, and information indicating an execution environment of processing with regard to the encryption scheme in the information communication apparatus.

6. The analysis system according to claim 1, wherein, the decryption unit determines, for each of the one or more extracted candidates of key data, whether the first data are correctly decrypted by the candidate of key data, by use of analysis result determination information that enables to determine whether the first data is successfully decrypted or not based on data indicating a feature of decrypted data that is a result of decrypting the first data.

7. The analysis system according to claim 6, wherein the data indicating the feature of decrypted data represent entropy of the decrypted data, and
the analysis result determination information includes information that enables to determine whether the first data is successfully decrypted or not based on entropy of the decrypted data.

8. The analysis system according to claim 6, wherein the data indicating the feature of decrypted data represent value of specific data included in the decrypted data, and
the analysis result determination information includes information that enables to determine whether the first data is successfully decrypted or not based on whether the decrypted data include the value of specific data.

9. The analysis system according to claim 6, wherein the data indicating the feature of the decrypted data represent data indicating a data format of the decrypted data, and
the analysis result determination information includes information that enables to determine whether the first data is successfully decrypted or not based on whether the data format of the decrypted data conforms to a specific data format.

10. The analysis system according to claim 1, wherein the key candidate determination information further includes information that enables to extract a candidate of encryption processing data, being used with the encryption key when decrypting the first data encrypted by the specific encryption scheme, from the second data based on a feature of the encryption processing data, and
the key candidate extraction unit extracts one or more of the candidates of the encryption processing data from the second data based on the key candidate determination information.

11. The analysis system according to claim 10, wherein the key candidate extraction unit selects, for each of the encryption schemes, an area to be searched when extracting, from the second data, at least one of the candidate of key data and the candidate of encryption processing data, based on the key candidate determination information.

12. The analysis system according to claim 1, wherein the at least one hardware processor is further configured to implement:

a memory acquisition unit that is configured to acquire at least part of data stored in a memory unit in an information communication apparatus including a computing unit and the memory unit; and
a communication processing unit that is configured to acquire data stored in the memory unit by the memory acquisition unit, when determining, based on communication data transmitted and received in accordance with a specific cryptographic communication protocol between the information communication apparatus and a communication network, that the key data including the encryption key used in encryption processing in the cryptographic communication protocol are stored in the memory unit, wherein
the first data are the communication data, and
the second data are data stored in the memory unit and acquired by the memory acquisition unit.

13. The analysis system according to claim 1, wherein, the decryption unit includes determining, for each of the one or more extracted candidates of key data, whether the first data are correctly decrypted by the candidate of key data, by use of analysis result determination information that enables to determine whether the first data is successfully decrypted or not based on data indicating a feature of decrypted data that is a result of decrypting the first data.

14. The analysis system according to claim 13, wherein the data indicating the feature of decrypted data represent entropy of the decrypted data, and
the analysis result determination information includes information that enables to determine whether the first data is successfully decrypted or not based on entropy of the decrypted data.

15. The analysis system according to claim 13, wherein the data indicating the feature of decrypted data represent value of specific data included in the decrypted data, and
the analysis result determination information includes information that enables to determine whether the first data is successfully decrypted or not based on whether the decrypted data include the value of specific data.

16. The analysis system according to claim 13, wherein the data indicating the feature of the decrypted data represent data indicating a data format of the decrypted data, and
the analysis result determination information includes information that enables to determine whether the first data is successfully decrypted or not based on whether the data format of the decrypted data conforms to a specific data format.

17. An analysis method comprising, by an information processing apparatus:
extracting, from second data, one or more candidates of key data that include an encryption key that enables to decrypt first data encrypted by a specific encryption scheme, based on data indicating a feature of the key data; and
extracting, from one or more of the candidates of key data, correct key data that enables to correctly decrypt the encrypted first data, based on a result of decrypting the first data by use of the extracted candidates of key data; and
extracting, from the second data, the one or more of the candidates of key data, based on key candidate determination information including the encryption scheme, and a key candidate determination criterion including information that enables extraction of the candidate of key data from the second data based on the data indicating the feature of the key data used in the encryption scheme, wherein the key candidate determination information includes an encryption parameter related to encryption algorithm and an execution environment of encryption processing related to the encryption algorithm.

18. A non-transitory computer-readable storage medium storing a computer program allowing a computer to execute:

processing of extracting, from second data, one or more candidates of key data that include an encryption key that enables to decrypt first data encrypted by a specific encryption scheme, based on data indicating a feature of the key data;

processing of extracting, from one or more of the candidates of key data, correct key data that enables to correctly decrypt the encrypted first data, based on a result of decrypting the first data by use of the extracted candidates of key data; and processing of extracting, from the second data, the one or more of the candidates of key data, based on key candidate determination information including the encryption scheme, and a key candidate determination criterion including information that enables extraction of the candidate of key data from the second data based on the data indicating the feature of the key data used in the encryption scheme, and wherein the key candidate determination information includes an encryption parameter related to an encryption algorithm and an execution environment of encryption processing related to the encryption algorithm.

* * * * *